US010762474B2

(12) United States Patent
Frank

(10) Patent No.: US 10,762,474 B2
(45) Date of Patent: Sep. 1, 2020

(54) ELECTRONIC CALENDAR DEVICES

(71) Applicant: Viralocity Software, LLC, Laguna Niguel, CA (US)

(72) Inventor: Linda A. Frank, Mission Viejo, CA (US)

(*) Notice: Subject to any disclaimer, the term of this patent is extended or adjusted under 35 U.S.C. 154(b) by 0 days.

(21) Appl. No.: 15/909,455

(22) Filed: Mar. 1, 2018

(65) Prior Publication Data
US 2018/0189744 A1 Jul. 5, 2018

Related U.S. Application Data

(63) Continuation-in-part of application No. 14/995,200, filed on Jan. 14, 2016, now abandoned.

(60) Provisional application No. 62/465,244, filed on Mar. 1, 2017, provisional application No. 62/103,508, filed on Jan. 14, 2015.

(51) Int. Cl.
*G06Q 10/10* (2012.01)
*G06F 21/62* (2013.01)
*G06Q 50/00* (2012.01)
*G06Q 10/06* (2012.01)

(52) U.S. Cl.
CPC ..... *G06Q 10/1095* (2013.01); *G06F 21/6218* (2013.01); *G06Q 10/1097* (2013.01); *G06Q 10/06314* (2013.01); *G06Q 50/01* (2013.01)

(58) Field of Classification Search
CPC ......... G06Q 10/1097; G06Q 10/06314; G06Q 50/01; G06Q 21/6218
USPC ...................................................... 705/7.19
See application file for complete search history.

(56) References Cited

U.S. PATENT DOCUMENTS

| 2009/0083365 | A1* | 3/2009 | Feldman | G06F 16/9537 709/201 |
| 2009/0100332 | A1* | 4/2009 | Kanjilal | G06Q 10/107 715/235 |
| 2009/0158200 | A1* | 6/2009 | Palahnuk | G06Q 30/00 715/781 |
| 2011/0071878 | A1* | 3/2011 | Gingras | G06Q 10/1093 705/7.18 |

(Continued)

OTHER PUBLICATIONS

Enlista Corporation Announces New Calendar Sharing Software PR Newswire Feb. 10, 2004: NA.*

(Continued)

*Primary Examiner* — Timothy Padot
(74) *Attorney, Agent, or Firm* — Chang & Hale LLP

(57) ABSTRACT

Calendar management devices and systems are disclosed that are configured with hardware to generate a calendar object and a calendar share identifier associated with the calendar object, and to cause the calendar share identifier to be provided to each of a plurality of calendar users. User input is received indicating a new event associated with the calendar object, and in response to the user input, the device(s) are configured to determine an authorization level of the new event based on the user input, generate a calendar event object comprising the authorization level, and automatically send a publication request to a remote server over a network, wherein said sending the publication request directs the remote server to determine a subset of the plurality of calendar users based on the authorization level and to send the event object to each of the subset of the plurality of calendar users. Media data indicative of one or more media items associated with the new event is received and associated with the event object.

20 Claims, 17 Drawing Sheets

(56) References Cited

U.S. PATENT DOCUMENTS

| | | | | |
|---|---|---|---|---|
| 2011/0154204 A1* | 6/2011 | Narayanaswamy | ..... | H04N 7/15 715/727 |
| 2013/0242708 A1* | 9/2013 | Siu | ....................... | G06Q 10/109 368/10 |
| 2014/0149886 A1* | 5/2014 | Los | ....................... | G06F 3/0481 715/753 |
| 2014/0310045 A1* | 10/2014 | Meltzer | .............. | G06Q 10/1095 705/7.19 |
| 2017/0052650 A1 | 2/2017 | Koolwal et al. | | |
| 2018/0123814 A1 | 5/2018 | Sexauer et al. | | |

OTHER PUBLICATIONS

Web conferencing: be here from there. Erlanger, Leon. PC Magazine 24.16: 32(3). Ziff Davis, Inc. (Sep. 20, 2005).*

StageIt: A Front Row Seat to a Backstage Experience, retrieval date: May 27, 2020 [online], 15 pages, [retrieved on May 27, 2020]. Retrieved from the Internet: <URL: https://www.stageit.com/site/landing>.

Josh Costine, Facebook Launches Standalone "Events" Discovery and Calendar App, Oct. 7, 2016 [online], 12 pages, [retrieved on May 27, 2020]. Retrieved from the Internet: <URL: https://techcrunch.com/2016/10/07/facebook-events-app/>.

Kris Holt, Facebook will Soon Let Streamers Charge for Broadcasts, Apr. 24, 2020 [online], 12 pages, [retrieved on May 27, 2020]. Retrieved from the Internet: <URL: https://www.engadget.com/facebook-live-streams-instagram-portal-181514338.html>.

Mariella Moon, Facebook's Experimental Feature Lets You Lip Sync Batter your Friends, Jun. 5, 2018 [online], 12 pages, [retrieved on May 27, 2020]. Retrieved from the Internet: <URL: https://www.engadget.com/2018-06-05-facebook-lip-sync-live.html>.

* cited by examiner

ELECTRONIC CALENDAR DEVICES

RELATED APPLICATIONS

This application claims priority to U.S. Provisional Application No. 62/465,244, filed on Mar. 1, 2017, entitled ELECTRONIC CALENDAR DEVICES. Moreover, this application is a continuation-in-part of U.S. patent application Ser. No. 14/995,200, filed on Jan. 14, 2016, entitled ELECTRONIC CALENDAR DEVICES, which claims priority to U.S. Provisional Patent Application No. 62/103,508, filed on Jan. 14, 2015, entitled ELECTRONIC CALENDAR MANAGEMENT. The disclosures of each of the above-referenced applications are hereby incorporated by reference in their entireties.

BACKGROUND

Field

The present disclosure generally relates to systems and methods for managing electronic calendar data.

Description of Related Art

Organization and management of digital calendars and event data associated therewith can present various challenges with regard to ease of calendar/event generation and/or updating.

SUMMARY

In some implementations, the present disclosure relates to a calendar management device comprising a non-volatile data storage medium, a user input interface, a wireless transmitter, and a controller configured to generate a calendar object configured to store unique calendar user identifiers identifying users associated with the calendar object and one or more event objects, each of the one or more event objects comprising an authorization value. The controller may be further configured to generate a calendar share identifier associated with the calendar object, store the calendar object in the non-volatile data storage medium, cause the calendar share identifier to be provided to each of a plurality of calendar users, and receive user input via the user input interface, the user input indicating a new event associated with the calendar object. In response to the user input, the controller may be further configured to determine an authorization level of the new event based on the user input, generate a calendar event object comprising the authorization level, and automatically send a publication request to a remote server over a network using the wireless transmitter. The controller may be further configured to receive media data indicative of one or more media items associated with the new event and associate the media data with the event object. The media data may comprise links to the one or more media items. The network may be, for example, the Internet or other wide area network.

In some embodiments, the controller may be further configured to receive discussion data indicative of one or more messages associated with the new event and associate the discussion data with the event object. The discussion data may comprise one or more messages from one or more users authorized to access the new event. The discussion data may further comprise media data indicative of one or more media items associated with the one or more messages.

In certain embodiments, the controller may be further configured to receive an acknowledgement response from each of the plurality of calendar users in response to causing the calendar share identifier to be provided to each of the plurality of calendar users. Furthermore, the controller may be further configured to, in response to receiving the acknowledgment responses, store unique user identifiers associated with each of the plurality of calendar users in the non-volatile data storage media as part of the calendar object.

The controller may be further configured to transmit the calendar object and the calendar share identifier to the remote server over the network using the wireless transmitter. In certain embodiments, when one of the plurality of calendar users provides the share identifier to the remote server, such providing the share identifier may direct the remote server to provide a copy of the calendar object to the one of the plurality of calendar users. The unique calendar user identifiers comprise 10-digit phone numbers associated with the respective users.

In certain embodiments, a user may include one or more media items (e.g., digital videos, digital images, etc.) in an event/meeting. For example, a user may include a digital image that is captured/stored on the user's client device. The client device may send the controller data indicating that the one or more media items should be included in the event/meeting. The controller may cause the client device to store the one or more media items on a storage server (e.g., a cloud storage platform). The controller may generate media data indicating/identifying the one or more media items and may associate the media data with the event/meeting (e.g., with the event object for the event/meeting).

In other embodiments, one or more users may transmit messages associated with an event/meeting (e.g., may exchange chat/text messages, may participate in a discussion, etc.). The one or more messages may be a discussion about the event/meeting between the one or more users. Each client device of a respective user may transmit a respective message to the controller. The controller may generate discussion data to represent the one or more messages. The discussion data may be associated with the event/meeting (e.g., with the event object for the event/meeting).

In some implementations, the present disclosure relates to a method for managing calendar data using a calendar management device. The method may involve generating a calendar object configured to store unique calendar user identifiers identifying users associated with the calendar object and one or more event objects, each of the one or more event objects comprising an authorization value, generating a calendar share identifier associated with the calendar object, storing the calendar object in a non-volatile data storage medium, causing the calendar share identifier to be provided to each of a plurality of calendar users, and receiving user input via a user input interface, the user input indicating a new event associated with the calendar object. In certain embodiments, the method involves, in response to said receiving the user input, determining an authorization level of the new event based on the user input, generating a calendar event object comprising the authorization level, and automatically sending a publication request to a remote server over a network using a wireless transmitter. Sending the publication request may direct the remote server to determine a subset of the plurality of calendar users based on the authorization level and to send the event object to each of the subset of the plurality of calendar users. In certain embodiments, the network is the Internet.

The method may further involve receiving an acknowledgement response from each of the plurality of calendar users in response to said causing the calendar share identifier to be provided to each of the plurality of calendar users. The method may further involve storing unique user identifiers associated with each of the plurality of calendar users as part of the calendar object in response to said receiving the acknowledgment responses. In certain embodiments, the method further involves transmitting the calendar object with the calendar share identifier to the remote server over the network using the wireless transmitter. In certain embodiments, when one of the plurality of calendar users provides the share identifier to the remote server, such providing may direct the remote server to provide a copy of the calendar object to the one of the plurality of calendar users. In certain embodiments, the unique calendar user identifiers comprise 10-digit phone numbers associated with the respective users.

In some implementations, the present disclosure relates to a calendar management system comprising a master scheduler device, a plurality of calendar user devices, and a remote calendar management server configured to be communicatively coupled to the master scheduler device and the one or more recipient devices over a network. The master scheduler device may be configured to generate a calendar object configured to store unique calendar user identifiers identifying users associated with the calendar object and one or more event objects, each of the one or more event objects comprising an authorization value, generate a calendar share identifier associated with the calendar object, store the calendar object in a non-volatile data storage medium, and cause the calendar share identifier to be provided to the plurality of calendar user devices, receive user input via a user input interface, the user input indicating a new event associated with the calendar object. In certain embodiments, in response to said receiving the user input, the master scheduler devices may be configured to determine an authorization level of the new event based on the user input, generate a calendar event object comprising the authorization level, and automatically send a publication request to a remote server over a network using the wireless transmitter. Sending the publication request may direct the remote calendar management server to determine a subset of the plurality of calendar user devices based on the authorization level and to send the event object to each of the subset of the plurality of calendar user devices.

The master scheduler device may be further configured to receive an acknowledgement response from each of the plurality of calendar user devices in response to said transmitting the calendar share identifier. In response to receiving the acknowledgment responses, the master scheduler device may store unique user identifiers associated with each of the plurality of calendar user devices as part of the calendar object.

In certain embodiments, the master scheduler device may be further configured to transmit the calendar object and the calendar share identifier to the remote calendar management server over the network using a wireless transmitter of the master scheduler device. When one of the plurality of calendar user devices provides the share identifier to the remote calendar management server, such action may direct the remote calendar management server to provide a copy of the calendar object to the one of the plurality of calendar user devices. In certain embodiments, the unique calendar user identifiers comprise 10-digit phone numbers associated with the respective users.

BRIEF DESCRIPTION OF THE DRAWINGS

Various embodiments are depicted in the accompanying drawings for illustrative purposes, and should in no way be interpreted as limiting the scope of the inventions. In addition, various features of different disclosed embodiments can be combined to form additional embodiments, which are part of this disclosure. Throughout the drawings, reference numbers may be reused to indicate correspondence between reference elements.

DETAILED DESCRIPTION

Figure 1A:
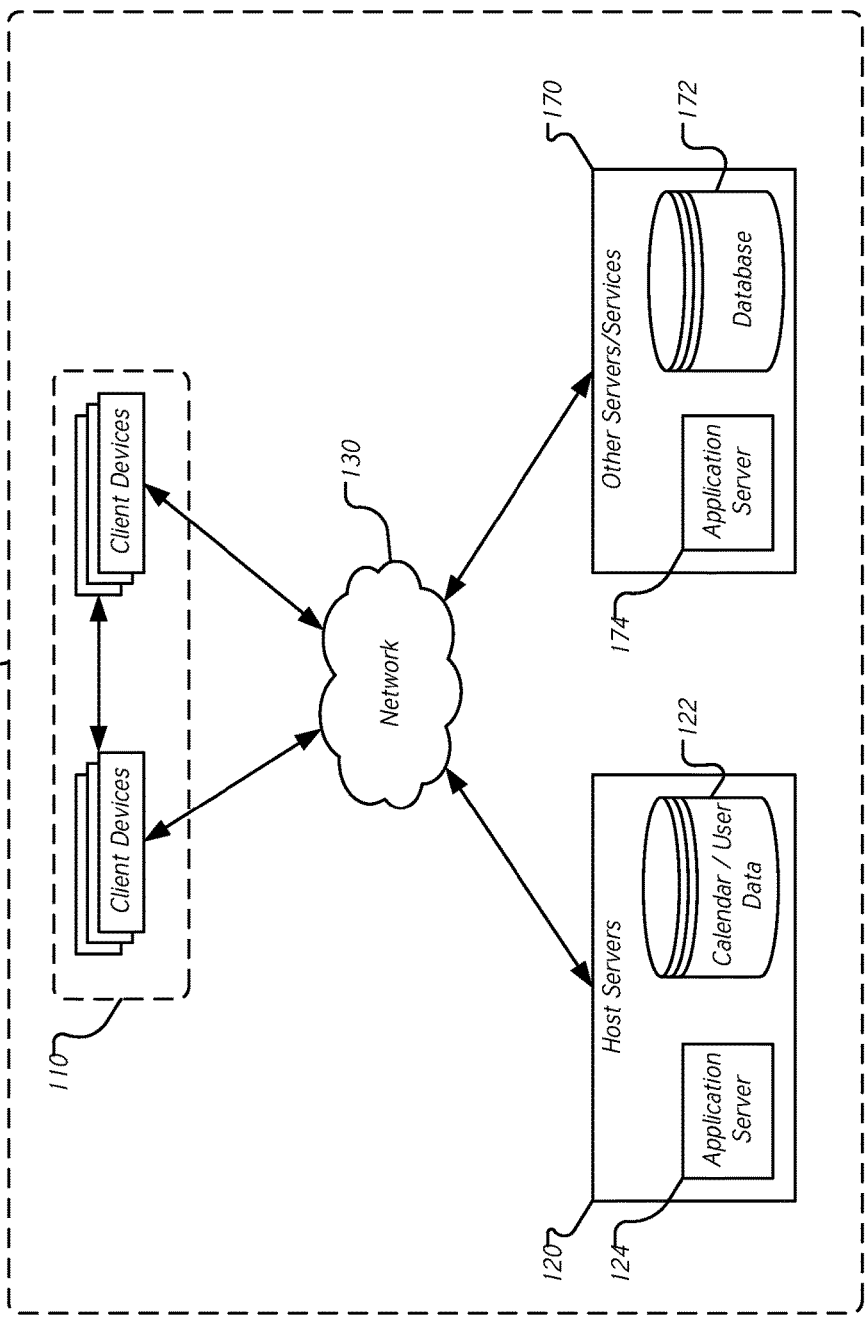
FIGS. 1A and 1B are block diagrams of calendar management systems in accordance with one or more embodiments disclosed herein.

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

The headings provided herein are for convenience only and do not necessarily affect the scope or meaning of the claims. Disclosed herein are example configurations and embodiments relating to calendar management systems.

Overview

In accordance with certain calendar management paradigms, an individual user maintains his or her own calendar, which may be viewable and/or manageable using a computing device, such as a desktop computer, laptop, mobile device (e.g., smartphone), or the like. As used herein, the term "calendar" should be interpreted according to its broad and ordinary meaning and may refer to a calendaring software application, a calendar object or data type, or any other software and/or hardware representation of calendar data, or software and/or hardware utilized in connection therewith. The term "object" is used herein according to its broad and ordinary meaning, and may refer to any type of data structure or data type having one or more parameters associated therewith.

Calendar display and/or management functionality may be implemented, for example, using a combination of hardware and/or software associated with a computing device. In certain embodiments, when a calendar event is to be shared with and/or provided to other users, it may be necessary for a user (e.g., scheduler, or "master" scheduler) to send a calendar event notice to the individual recipients, wherein each of the recipients may be required to add the calendar event to his or her personal calendar/calendar program in order to view the event in the context of the recipient's personal calendar/calendar program. Updates to the original calendar event may require the recipient to incorporate such updates into his or her personal calendar. Furthermore, in certain embodiments, when a recipient wishes to share the calendar event with a secondary recipient, it may be necessary for the recipient to forward the original event in addition to any subsequent updates to the secondary recipient in order to ensure that the up-to-date event information is communicated to the secondary recipient.

Certain calendar system embodiments provide for "shared" calendars. For example, a scheduler (e.g., "master" scheduler) user may make available the scheduler's calendar to the desired recipient(s). The term "shared" is used herein according to its broad and ordinary meaning, and may be used herein in the context of shared calendars and/or events to refer to calendars and/or events that are known or accessible to a plurality of individuals or users. In certain embodiments, it may be desirable for a shared calendar to be carefully managed in order to at least partially prevent undesired overexposure of one or more portions or aspects of the calendar. For example, one or more portions or aspects of a calendar may comprise confidential and/or sensitive information that the scheduler or manager of the calendar may not wish to share beyond a subset of shared users of the calendar. Furthermore, in certain embodiments, it may be necessary or desirable for users to be registered in a substantially centralized directory in order to have access to the shared calendar; a recipient or member associated with the shared calendar may not have the ability and/or permission to invite secondary users/recipients to use the shared calendar and/or calendar event(s) associated with the shared calendar unless such secondary users/recipients are identified in the directory as a potential recipient of the shared calendar and/or one or more calendar events associated therewith, or dependent on authority of the recipient or member to invite secondary users/recipients.

Certain calendar management systems involve management of calendars and/or events for users at the individual event level. In such systems, substantially no calendar-level management or grouped calendar events may be provided. Therefore, in such systems, it may be necessary for a scheduler to manually gather and/or export multiple calendar events in order to perform a single distribution of calendar events to a user group. In addition, in certain systems, updates and/or changes made to individual calendar events may trigger multiple user alerts and/or notifications due to management at the individual event-level versus higher-level calendar or subset of calendar alert and/or notification management.

Certain embodiments disclosed herein advantageously provide calendar management systems and/or methods allowing for shared calendar usage without one or more of the various complexities and/or limitations associated with certain of the calendar systems described and/or referenced above. For example, certain embodiments may not require calendar recipients to be registered with a calendar management system or server prior to accessing shared calendars and/or calendar data. In certain embodiments, a secondary recipient may be able to receive up-to-date calendar event information without the scheduler or original recipient having to take substantial additional steps to update the relevant event(s) or notify the secondary recipient directly. Certain embodiments may further allow for sharing of a calendar, or subset of calendar events associated therewith, in a single process, rather than necessitating the sending of multiple calendar event notifications. Certain calendar management systems/methods may further provide a calendar platform that may be configurable to interface with a computing device's native calendar application/software, or other external calendar system(s), thereby providing a single unified calendar system that integrates otherwise disparate calendar systems.

The systems and methods described herein provide a variety of improvements over certain calendar management paradigms. For example, embodiments provide a configurable, unified calendar platform that allows for exchange and management of media items. Users may provide media items to be associated with an event/meeting. The media items may enhance the calendar platform by allowing the users to provide additional information about an event/meeting. The media items may be indicated/identified using media data (e.g., identifiers, links to the media items, etc.) which are associated with event/meeting. Users who are allowed to access an event/meeting may use the media data to access the media items (e.g., to download/view the media items).

Embodiments further provide a configurable, unified calendar system that allows for transmission and management of digital messages. Users may transmit one or more messages about an event/meeting (e.g., users may have a discussion about the event/meeting). The messages may be stored/represented using discussion data which is associated with an event/meeting. Users who are allowed to access an event/meeting may use the discussion data to view messages (e.g., a discussion) about the event/meeting. Users may also include media items as part of a message. In some embodiments, users may not be required to be registered with a calendar management system or server prior to accessing media items and/or messages associated with an event/meeting.

Calendar Management System

FIG. 1A is a block diagram of a calendar management system in accordance with one or more embodiments disclosed herein. The system of FIG. 1A includes a network environment 100 that may comprise one or more host servers 120, client devices 110, and/or other servers 170. The network environment 100 can be connected by any network infrastructure 130, which may be public and/or private, using any suitable or desirable protocol or combination of protocols. For example, in certain embodiments, one or more devices of the network environment 100 may communicate information over the public Internet network, such as via cellular data network(s), whereas one or more devices may further receive information over local wired and/or wireless local area networks (e.g., Ethernet) connected to the Internet via an Internet Service Provider (ISP). In certain embodiments, one or more devices and/or networks may be implemented using a private network over, for example, Ethernet and/or radio network protocols.

The host server(s) 120 may contain a repository of calendar and/or user data 122 as well as a calendar application server 124. The calendar and/or user data repository, or data store, 122 and/or the application server 124 may reside on a single server or may be spread across multiple servers, as desired or practical. As a whole, the host server(s) may be considered a single logical entity for simplicity purposes as described herein; that is, references to a server or host server herein may represent one or more servers or devices configured to provide server-type functionality and/or services. The application server 124 may be implemented according to executable code and/or associated server components used to support computing on the server 120. The calendar/user data 122 may collectively comprise logical data, executable code, and/or associated components to support storage, data management, and retrieval of the data. The calendar/user data 122 may comprise calendar information consisting of one or more of various data structures or data types. For example, calendar data may comprise one or more calendar objects or data structures incorporating various calendar-related parameter(s), and/or calendar event objects or data structures incorporating event-related parameter(s).

In one embodiment, the calendar/user data 122 may include media data and/or discussion data. Media data may be data that indicates/identifies one or more media items that are associated with or are included with an event object (which represents an event/meeting). For example, the media data may include one or more of a name (or other identifier) for a media item, a link to a location of the media item (e.g., a universal resource locator (URL)), a type for the media item (e.g., a video type, a picture type, etc.). Discussion data may be data that indicates/represents one or more messages (e.g., chat/text messages) that are associated with or are included with an event object. In some embodiments, the media data may also be data that indicates/identifies one or more media items that are to be included in messages (e.g., a discussion) associated with or included with an event object.

In one embodiment, the storage server 180 may store media items that are associated with or are included with an event object. For example, a user of a client device 110 may add a media item (e.g., a digital movie) to an event/meeting. The client device 110 may be directed to store the media item on the storage server 180 (e.g., to transmit the media item to the storage server 180), or the client device 110 may transmit the media item to the host servers 120 and the host servers 120 may store the media item on the storage server 180. In one embodiment, the storage server 180 may part of a cloud storage platform. For example, the storage server 180 may be managed and/or hosted by cloud storage vendor/provider that provides storage capacity and/or services. Although the storage server 180 is illustrated as being separate from the network environment 100, one having ordinary skill in the art understands that the storage server 180 may be part of the network environment 100 in other embodiments. As used herein, a media item may include an electronic file that can be executed or loaded using software, firmware or hardware configured to present digital content (e.g., video, images, audio, text, etc.). Examples of media items include, but are not limited to, digital images/pictures, digital videos/movies, digital audio, streaming videos/movies, audio clips, movie clips, TV clips, music videos, video blogs, short original videos, pictures, photos, other multimedia content, etc. A media item may also be referred to as multimedia, a multimedia item, a digital media, digital content, etc.

The host server(s) 120 may be configured to facilitate calendar information communication between the client devices 110, and possibly other server(s) 170. Client devices 110 may exchange calendar information via the host server(s) 120 over the network 130, directly between client devices 110 via the network 130 and/or through direct device-to-device information exchange, such as over a local pairing or network connection (e.g., Bluetooth, near-field communication, infrared, etc.).

Other servers and services 170 may be provided using other logical server instances or included with the host server(s) 120. The other server and services 170 may provide additional services to the host servers for support processing, or the services may be provided directly to the client devices. Server features and services may be related to calendar information processing and/or other context-driven features. Examples of other server services may include, but are not limited to, credit card processing/billing, video chat features, document collaboration, and the like. The other services may also provide additional services or data to the client devices. Examples include but are not limited to map/navigation and traffic services, advertising/marketing services, local weather/news information alerts, and/or other services.

Figure 1B:
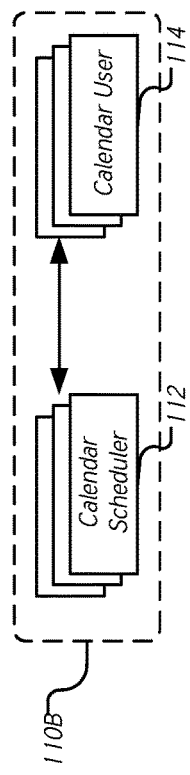

FIG. 1B is a block diagram of an example client device subsystem 110B. The client devices/systems 110B may be computing devices configured to function as one or more of a calendar scheduler 112 (e.g., where a user creates and/or has authority/capability to create or manage a new calendar or updates to an existing calendar) or a calendar user 114 (e.g., where a user/device receives a new calendar or update to an existing calendar).

Figure 2:
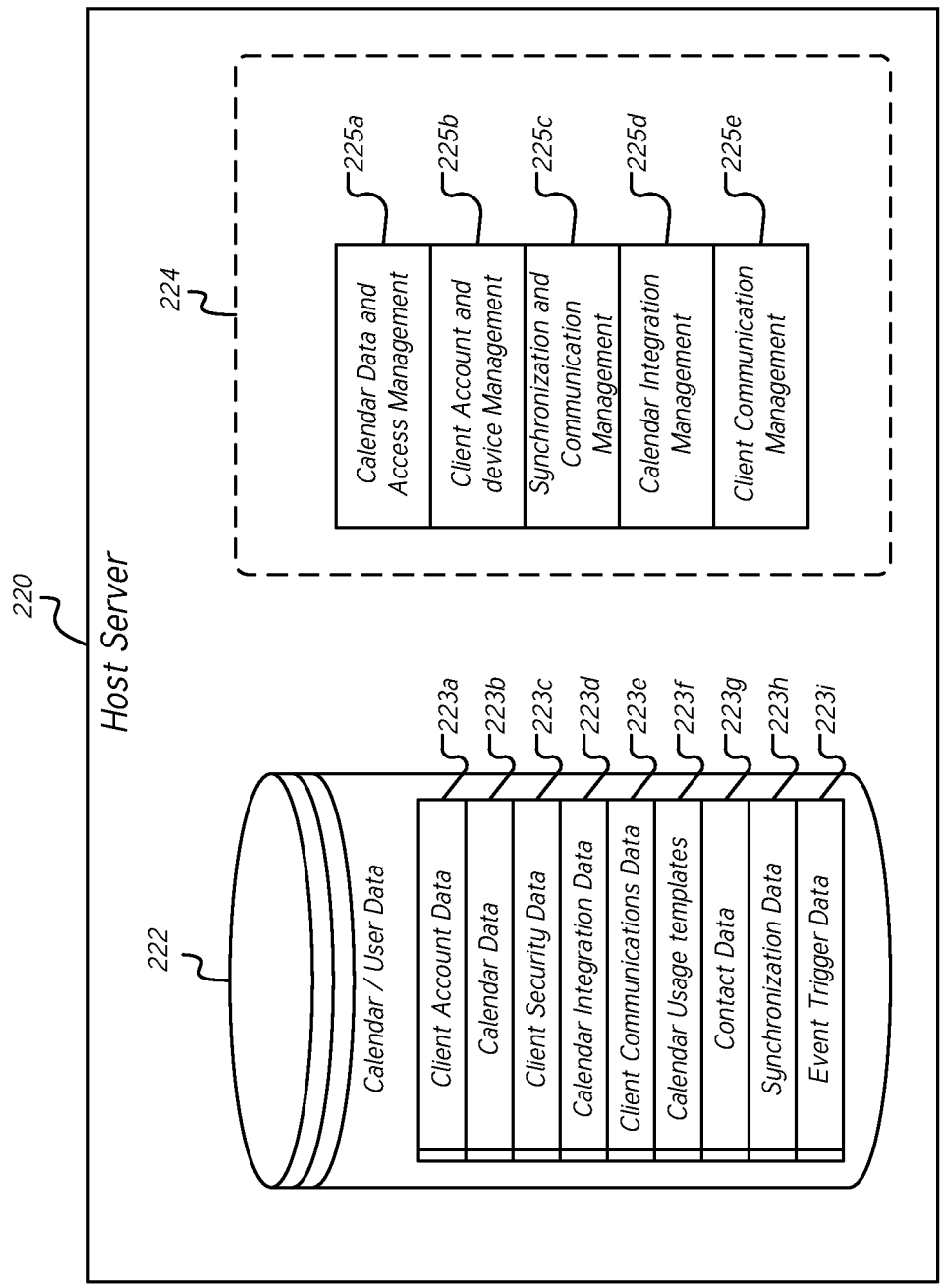
FIG. 2 is a block diagram providing a representation of a host server in accordance with one or more embodiments.

FIG. 2 is a block diagram providing a representation of a host server 220 according to one or more embodiments. The host server 220 may provide a representation of one or more of the host server(s) 120 shown in FIG. 1A and described above. Although the illustrated server 220 includes various components illustrated together on a single host server 120, it should be understood that the various components and modules shown in FIG. 2 may be distributed across multiple servers, devices or locations/sites. The host server 220 may contain a calendar/user data repository 222, as well as one or more calendar application server 224 components, which may be utilized for calendar management and/or calendar information exchange between one or more client devices.

The calendar data store 222 may contain at least a portion of calendar data that is made available through various application server 224 processes. Client devices (e.g., client devices 110 in FIG. 1A) may be able to access at least some data stored in the calendar data store 222 via one or more services that may be provided by the application server 224. For convenience, such services, among possibly others, are represented by a calendar data and access management module or interface 225a, as illustrated in FIG. 2. Calendar data may comprise metadata associated with calendar events, users, as well as abstract objects for managing calendar metadata. Such abstract objects for managing calendar metadata may include control information for calendar state (e.g. private, shared, and/or published) as well as device synchronization information such as active device lists, or incremental change records. The calendar data store 222 may be maintained in connection with one or more processes designed to maintain integrity of the data and may further provide various interfaces for interaction with the stored data.

The calendar data store 222 may maintain various types of calendar and/or user-related data. For example, the data stored in the data store may include client account data 223*a* which may be available to certain system processes for account maintenance and/or management. Client account data 223*a* may include unique client calendar codes/identifiers and/or account billing information. The client account data may further include security tokens/data for user authentication, such as fingerprint, retina, voice, or any other individual unique identification data, which may be used to manage authorized access to calendar data.

The access management module 225*a* may be configured to interface with one or more other modules of the application server 224, such as a synchronization module 225*c* and/or calendar integration module 225*d*, to determine changes/updates to data stored in the calendar data store 222 as well as to communicate the data to client devices 110, such as via the synchronization module 225*c*. The access management module 225*a* may implement one or more forms of authentication of user clients using native device identification (e.g. phone # and text) or through external authentication sources (e.g. third-party social media sites).

Calendar and user data 222 may include network configuration defaults, custom device and/or calendar configuration, user account information, and other calendar-related data. Examples of user data 222 may include device configuration preferences stored on the host server for client device synchronization and/or backup/retrieval, contact lists, or default greetings for calendar users.

In an embodiment, the client account data 223*a* includes a collection (e.g., array) of calendar user/recipient objects, each associated with a unique user identifier. The unique user identifier may be any suitable or desirable identification value or data structure that may potentially uniquely be associated with a user, such as a phone number, social media account identifier or authorized social media account, unique username, email address, or the like. In certain embodiments, each user/recipient object comprises one or more additional parameters, which may be customized for a particular type of user or calendar. For example, each user/recipient object may comprise a parameter (e.g., array) identifying each calendar, or each calendar of a particular type, with which the user/recipient is associated (i.e., belongs or has been invited and/or accepted to).

The calendar data 223*b* may comprise a listing or collection of calendar objects, each of which may comprise one or more parameters providing information associated with the calendar. For example, a calendar object may comprise user/authorization, or classification, information, such as an identification of users associated with the calendar and associated information indicating an authorization group/level, or classification indicating a scope of involvement of the user with the calendar, wherein users having different authorization levels or classifications may receive different subsets of the calendar data.

The calendar data and access module 225*a* may comprise one or more processes and/or information for facilitating sharing of calendar data 223*b* to users' client devices 110, as well as possibly to promote or ensure confidentiality, integrity, and/or accuracy of calendar data. The calendar data store 222 may further include calendar access information, which may enable at least partially centralized management of a single-calendar while at the same time individualized visibility and/or notification of events associated with the shared calendar, such as based on the user authorization/classification data of the client account data 223*a* or the calendar data 223*b* discussed above. Enhanced controls maybe configured when additional layers of confidentiality and/or control are desired for highly sensitive calendar/user data.

In certain embodiments, the distribution of calendar data 223*b* and the sharing of calendar data between devices is not managed like certain other calendar systems in various respects. For example, calendar events may be grouped together in any number of associated groups/levels/classifications for updates and/or distribution to calendar users (e.g., calendar users 114 in FIG. 1B) while still maintaining ownership and visibility under a single master calendar (e.g., 410 in FIG. 4). In certain embodiments, a calendar scheduler may manage a single calendar in its entirety using a selected usage template 223*f*, whereas calendar users may have individualized visibility on various devices and/or platforms via relatively simple access-sharing protocols. Although FIG. 2 illustrates a variety of visually-separate blocks representing different types of data, such visual segregation is provided for convenience and any data shown and/or described herein may be integrated with, or separate from, any other data, depending on the embodiment. Furthermore, additional types of data not represented in FIG. 2 may be included in certain embodiments, and certain of the illustrated data types may be omitted, as desired or practical, in certain embodiments.

In some embodiments, the media data 223*j* may include data that may indicate and/or identify media items that are associated with events (which are included in one or more calendars). For example, the media data 223*j* may indicate that a media item is associated with a particular event for a particular calendar. In another example, the media data 223*j* may identify a media item. For example, the media data 223*j* may include an identifier (e.g., a name, an alphanumeric identifier, etc.) for a media item. In one embodiment, the media data 223*j* may be included as part of the calendar data 223*b*.

In some embodiments, the discussion data 223*k* may include data that may indicate/represent one or more messages about an event/meeting (e.g., a discussion between users about an event/meeting). For example, the discussion data 223*k* may include a record of chat messages exchanged between two users using the calendar platform. The discussion data 223*k* may also include and/or refer to media data when a message includes a media item. For example, a user may transmit a message that may include a digital image of an event venue. The discussion data 223*k* (which may represent/indicate the message) may include media data for the digital image or may refer to media data for the digital image. In one embodiment, the discussion data 223*k* may be included as part of the client communications data 223*e*.

Calendar Share Identifiers (Share IDs)

The calendar data and access module 225*a*, or other module of the server (or client) system, may be configured to generate calendar share identifiers (share IDs) or other data (e.g., unique identifiers) in response to certain events or requests, such as when a user indicates a desire to distribute a new calendar or a new set of calendar events to one or more users. For purposes of this disclosure, the terms "share identifier," "share ID," variations thereof and/or like terms may be used interchangeably. A unique share ID may allow for access to calendar events associated or correlated with the share ID. The share ID can be sent to users via the client communication management module 225e or through any external process.

Use of share IDs may allow for a calendar scheduler 112 to easily distribute access/authorization to a calendar to desired calendar recipients/users. In certain embodiments, a share ID is the only key/item a calendar user 114 requires in order to access a calendar and/or to associate a calendar to a user's client device 110. For example, a share ID may be distributed via the calendar application/software 324 to a user's contacts or via a website, news bulletin, and/or mass publication. The share ID may allow a calendar user 114 to automatically receive calendar updates associated with the share ID without requiring the calendar user to initiate checking for calendar updates. In certain embodiments, a share ID plus secondary identification information may be required to access a calendar where additional security is desired. Examples of where a secondary level of security identification may be desired include calendar schedules for doctor/client appointments, personal travel itineraries, and/or employee work schedules.

The relevant calendar/user data store may maintain user/share ID association data indicating for a given user the calendars that the user has been authorized for and/or invited to through share ID distribution as described herein. In certain embodiments, acknowledgment by a user of a received share ID may be required before user/share ID association is complete and represented, for example, at the backend calendar management server.

The application server 224 may implement certain processes to support user device authentication and/or security management. Calendar data 223b on the server 220 may be stored in a secured manner and may be available only to authorized users and/or by authorized methods. Client device security may be integrated as part of existing device security mechanisms or may be independent of the devices mechanisms.

Figure 3:
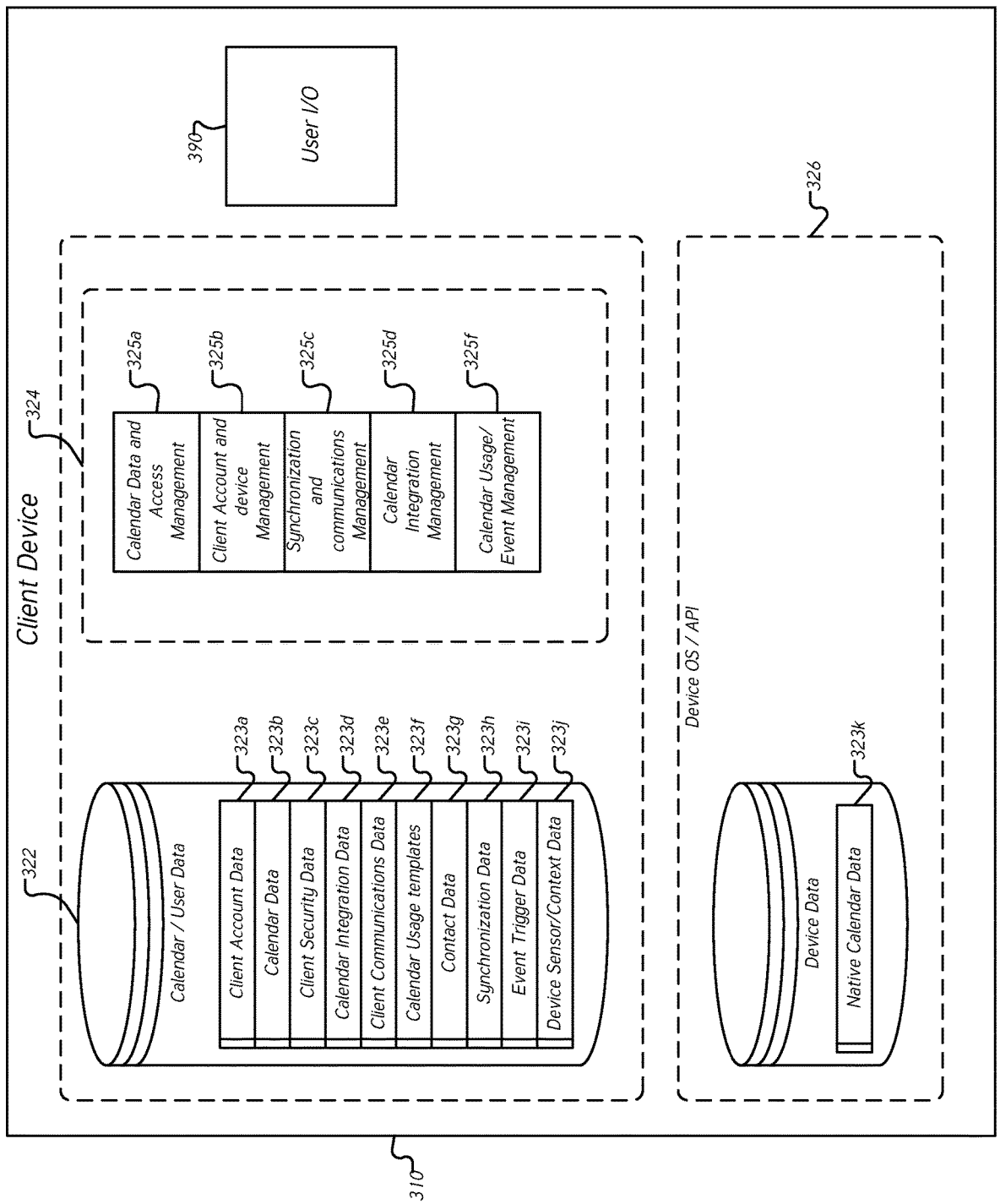
FIG. 3 is a block diagram providing a representation of a client device according to one or more embodiments.

FIG. 3 is a block diagram providing a representation of a client device 320 according to one or more embodiments. For example, the client device 320 may represent an embodiment of one or more client devices of the client subsystem 110 of FIG. 1A and described above. With further reference to FIG. 2, the application server 224 may implement certain processes to support synchronization and communications management 225c. Such processes may maintain synchronization of calendar information 223b between client devices 110. The server synchronization module 225c may work in conjunction with device synchronization modules 325c (shown in FIG. 3) to ensure the accurate and/or integrity of information transferred between client device(s) and host server(s) when a calendar update has been published or any other triggering event occurs. For example, one such triggering event may be after a scheduler has made one or more changes to a calendar and sets the calendar state to "publish," which may trigger the application server to automatically send a notification and update availability to devices as managed by the synchronization module 225c. The synchronization management processes may also support information transfers among client devices for client communication data 323e (see FIG. 3).

The synchronization module 225c may support synchronization of calendar data 223b between the server(s) and device(s), as well as between local device calendar data and the device's native calendar data 323k. For example, in one embodiment a synchronization module may maintain a list of active users/devices connected to the system to target real-time information exchanges between the devices. Another embodiment may allow for a user/device to query the application server 224 to determine a calendar state and determine if a refresh of calendar data is required. The synchronization module 225c may manage conflicts among calendar events and allow the user to respond to the conflict. Examples of conflicts may be event overlap or employee schedule maximums.

The synchronization module 225c may also support synchronization between external calendar systems and the calendar system 100 (see FIG. 1). This synchronization may be necessary if a source of calendar information is another externally-maintained calendar system or as between multiple networks of calendar systems. Examples of possible external calendar system interfaces may be Microsoft Exchange or Google Calendar, or other calendar platforms. In certain embodiments, synchronization and integration processes may support calendar and user data integration between external calendar systems and make them available to calendar users 114 within the calendar application without additional user action.

The synchronization and communications module 225c may contain processes and data required to facilitate communications among host servers (e.g., host server(s) 120 in FIG. 1A), client devices (e.g., client device(s) 110 in FIG. 1A), and/or other servers (e.g., server(s) 170 in FIG. 1A). Communications may be system process data interactions (e.g. data synchronization, system updates, session management) and/or client device user interactions (e.g. text, video chat, document exchanges). For example, additional information exchanges may be used for team coordination of tasks or assignments related to an event, or for confidential payment service processing for a scheduled service. In certain embodiments, the synchronization and communications module 225c may support client communications via direct device to device communication, via host servers, and/or via external services depending. The communication module may support real-time and/or asynchronous communications between users within the system. For example, users may exchange messages (e.g., chat messages, text messages, etc.) to discuss an event/meeting (e.g., to discuss possible venues, agendas, transportation to the event, etc.). The messages may be associated with an event/meeting and may be stored/represented using discussion data.

The communication process may be initiated at any time by user interaction with the device, by a system event on the user's behalf, and/or by another trigger event of the like. Client communications may be associated to a calendar event when initiated within the context of a calendar event.

Cross Platform Calendar Integration

With further reference to FIG. 2, the calendar application 224 may contain calendar integration management processes 225d to support import/export and/or conversion of calendar information between external calendar data types and/or various calendar systems. In certain embodiments, calendar integration data 223d may contain conversion mappings of possible data types for import/export of calendar information between systems and/or devices. The calendar integration module allows for the communication between external calendar systems and between the proprietary calendar data type and native device calendar data types. The calendar integration module allows for the integration of the system calendar information with any calendar platform.

The calendar integration module 225*e* is critical to supporting multiple calendar data import/export and distribution of the calendar system on multiple device platforms. The calendar integration module allows for the calendar system to bridge calendar platform boundaries and for the calendar system to work across current technical limitations. In certain embodiments, the calendar integration module 225*e* may provide linkage to an external calendar system where a calendar scheduler wishes to share calendar events from the external calendar system without exposing access credentials to and/or awareness of the external calendar system.

For example, a calendar scheduler (e.g., calendar scheduler 112 in FIG. 1B) may desire to share publicly-specific calendar event information from a work calendar system. The calendar event information may be reoccurring but may have additional information updated regularly within the calendar event. The calendar integration module may allow for the user to link to the work calendar system with appropriate credentials to associate specific calendar items to be grouped by a share ID. The share ID may be publicly distributed and calendar users may automatically be provided updates of the calendar events whenever the calendar events are updated within the work calendar system.

With respect to FIG. 1A, the calendar integration module may be implemented by the host servers 120, by the client devices 110, by other servers 170, or by any combination thereof.

The calendar application/software 224 may contain data type definitions and patterns of usage for calendar data according to one or more embodiments. Usage templates 223*f* may define allowable parameters of user interactions for specific use cases. The usage templates may be configured and customizable as needed for efficient calendar scheduling where predetermined interactions and/or behaviors may facilitate ease of calendar entry and management. Examples of possible patterns may include calendar entry for team events, client/patient appointments, and employee schedules.

The usage templates 223*f* may facilitate relatively efficient and easy-to-use user interaction to calendar data. Specialized controlled methods of user interaction with calendar data may include, but are not limited to, data entry, view/display, notification alerts, and device interface interactions. The calendar usage template modules may use any system or device data available such as calendar data, device sensory data, and event trigger data. Configurable behaviors may also include notification or a prompt when schedule conflicts are detected by the system.

Each template may have a unique set of calendar event attributes as well as specific available behavior methods to act upon the calendar data. The combination of data and interaction methods is identified by the template. Interaction methods may also include specific process sequencing or event triggers.

FIG. 3 shows a block diagram illustrating an embodiment of a client device 320. Although the various components are shown together as components of a single client device 320, it should be understood that the various components may be distributed across multiple devices or a cluster of devices. The client device 320 may contain calendar and/or user data maintained in a data store 322, as well as one or more calendar application modules 324, which may be used for calendar management and/or calendar data exchange between client devices (e.g., client devices 110 in FIGS. 1A, 1B).

The calendar application 324 and calendar/user database 322 may contain some or all of the data and/or processes to implement the calendar system functionality on the device. The device OS/API 326 may provide one or more interfaces to general device services, such as data storage or memory, user interface components, and/or network layer communications. The device OS/API may also provide certain device-specific interface(s) to native device calendar data and/or sensor or user context data.

The calendar data 322 repository may contain the device's local calendar information, which may comprise at least a portion of calendar data as identified by share IDs that is available through the calendar application 324 process(es). In certain embodiments, a user may access the device's calendar repository 322 via the calendar data and access management 325*a* interface(s)/module(s). Calendar data may comprise certain metadata associated with calendar events, as well as possibly abstract objects that may be required or useful in managing calendar metadata. The calendar data store 322 may be maintained in connection with one or more processes designed to maintain integrity of the data, and may provide interfaces for interaction with the stored data. The device's calendar data 322 may contain individualized calendar data specifically tailored to the user as determined by the calendar data and access management module 325*a*, such as one or more calendar objects and event objects, as described above with respect to the maintenance of such data by the system illustrated in FIG. 2.

The calendar data store 322 may maintain various types of calendar and/or user-related data. For example, the data stored in the data store may include client account data 323*a*, which may be available to certain system processes for account maintenance and/or management. Client account data 323*a* may include unique client calendar codes/identifiers and/or account billing information. The client account information 323*a* may further include security tokens/data for user authentication such as fingerprint, retina, voice, or any other individual unique identification data, which may be used to manage authorized access to calendar data 323*b*.

The access management module 325*a* may be configured to interface with one or more other modules of the calendar application 324, such as a synchronization and communications module 325*c* and/or calendar integration module 325*d* to determine changes/updates to data stored in the device's calendar data store 322 as well as to communicate the data to host servers 120 and client devices 110, such as via the synchronization module 325*c*.

Calendar and user data 322 may include network configuration defaults, custom device or calendar configuration, user account information, and/or other calendar-related data. Examples of user data 322 may include device configuration preferences stored on the host server for client device synchronization and/or backup/retrieval, contact lists, or default greetings for calendar users.

The calendar data and access module 325*a* may comprise one or more processes and/or information for facilitating using and sharing of calendar information 323*b* to other client devices as well as possibly to promote or ensure confidentiality, integrity, and/or accuracy of calendar data. The calendar data store 322 may further include calendar access information, which may enable at least partially centralized management of a single-calendar while at the same time individualized visibility and/or notification of events associated with the shared calendar. A user may interact with the calendar data 323*b* to view specific calendar events or the entire calendar in entirety.

In certain embodiments, the distribution of calendar data 323*b* and the sharing of calendar data between devices is not managed like certain other calendar systems in various respects. For example, calendar events may be grouped together in any number of associated groups for updates and/or distribution to calendar users 114 while still maintaining ownership within a single master calendar 410. Such grouping of calendar data and events may be facilitated through the use of calendar, user, and/or event objects, which may comprise parameter data associated calendars with user identifiers and/or share IDs, as well as associating users with associated calendars and/or events. In certain embodiments, a calendar scheduler may manage a single calendar in its entirety using a selected usage template 323*f*, whereas calendar users may have individualized visibility on various devices and/or platforms via relatively simple access-sharing protocols.

The calendar data and access module 325*a* may be configured to generate unique share identifiers (share IDs) or other data (e.g. unique identifiers) in response to certain events or requests, such as when a user indicates a desire to distribute a new calendar or a new set of calendar events to one or more users. A unique share ID, which may be stored as part of a calendar object, may allow for access to calendar events associated or correlated with the share ID. The share ID can be sent to users via the synchronization and communication management module 325*c* or through any external process.

In certain embodiments, when an authenticated client device receives or has a unique calendar ID added to the user/devices calendar list, a single notification message may be sent to the user/device and all relevant calendar data may be available to the client device to refresh the local calendar data.

The device security module 325*b* may contains processes and data required to support user device authentication and security management. Calendar information 323*b* on the device may be stored in a secured manner and available only to authorized users and/or by authorized methods. The client device security 325*b* may be integrated as part of existing device security mechanisms or may be independent of the devices mechanisms as needed.

The calendar application 324 may implement certain processes to support synchronization and communications management 325*c*. Such processes may maintain synchronization of calendar information 323*b* between a host server (e.g., host server(s) 120), other client devices 110, other servers 170, and/or native device calendar data (if applicable) 323*k*. The client device's synchronization module 325*c* may work in conjunction with host server synchronization modules to ensure the accuracy and/or integrity of information transferred between client devices and host server(s) when a calendar update has been made or any other triggering event occurs. The synchronization management processes may support information transfers/updates among client devices for client communication data 323*e*.

In certain embodiments, the synchronization module 325*c* may manage synchronization of calendar data 323*b* between the host servers and client devices as well as possibly between the local device calendar data 323*b* and the device's native calendar data 323*k*. The module may manage any conflicts among calendar events and allow the user to respond to the conflict. Examples of conflicts may be event overlap or employee schedule maximums.

The device synchronization module 325*c* may also support synchronization between external calendar systems and the calendar application 324. This synchronization may be necessary or desirable if a source of calendar information is another, externally-maintained, calendar system, or as between multiple networks of calendar systems. An example of possible external calendar system interfaces may be Microsoft Exchange, Google Calendar, or the like.

The synchronization and communications module 325*c* may contain certain processes and/or data required to facilitate communications among relevant host server(s), client device(s), and/or other server(s). Communications may be system process data interactions (e.g. data synchronization, system updates, session management) or client device user interactions (e.g. text, video chat, document exchanges). The synchronization and communications module 325*c* may support client communications via direct device-to-device communication, via host servers, or external services, depending possibly on implementation configuration. The communication module may support substantially real-time and/or asynchronous communications between users within the system.

In certain embodiments, the communication process(es) may be initiated substantially at any time by user interaction with the device and/or on the user's behalf when triggered by a system event. Client communications may be associated with a calendar event when initiated within the context of a calendar event.

The various components of FIG. 3 may provide cross-platform calendar integration functionality. For example, the calendar integration module 325*d* may contain system processes and data needed to import/export or convert calendar information between any calendar data types. The calendar integration data 323*d* may contain conversion mappings of various data types possible for import/export of calendar information. In certain embodiments, the calendar integration module may allow for the communication between external calendar systems and/or between the proprietary calendar data types disclosed herein and native device calendar data types. The calendar integration module 325*d* may allow for the integration of the system calendar information with any calendar platform.

The calendar integration module 325*d* may serve to supporting multiple calendar data import/export and/or distribution of the calendar system on multiple device platforms. In certain embodiments, the calendar integration module may allow for the calendars to cross platform boundaries and for the calendar system to work across certain current technical limitations. The calendar integration module 325*d* may be implemented by the host servers, by the client devices, by other server(s), or by any combination thereof.

The calendar usage/event module 325*f* may contain the data type definitions and/or patterns for usage for calendar types to be used by system processes and client devices. The usage templates may define allowable parameters of user interactions for specific use cases. In certain embodiments, the usage templates 323*f* can be configured and customizable as needed for efficient calendar scheduling. Examples of usage templates may include calendar entry parameters and behaviors for team events, client/patient appointments, and employee schedules, among others.

These usage templates may facilitate relatively efficient and easy-to-use user interaction to calendar data. The specialized controlled methods of user interaction to calendar data may include, but is not limited to, user interface controls, data entry, view/display, and/or notification alerts. The calendar usage template modules may use any system or device data available, such as calendar data, device sensory data, event trigger data, and/or combinations thereof. Configurable behaviors may also include notification or a prompt when schedule conflicts are detected by the system.

Each template may have a unique set of calendar event attributes as well as specific user behavior methods to act upon the calendar data. The combination of data and interaction methods may be identified by the template. Interaction methods may also include specific process sequencing or event triggers. Event parameters may be internal to calendar application processes or derived from device sensor and/or context information 323$j$. The calendar usage and event module 325$f$ may interface with the device's sensors and context information 323$j$ to provide parameter inputs for the usage templates were applicable.

Examples of sensory information may include GPS location and movement, network availability, media availability (phone, camera, etc.), and system services availability. Examples of device context information may include phone status, call ID, application status, date/time information within application text, and voice recognition.

In some embodiments, the media data 323$n$ may include data that may indicate and/or identify media items that are associated with events (which are included in one or more calendars). For example, the media data 323$n$ may indicate that a media item is associated with a particular event for a particular calendar. In another example, the media data 323$n$ may identify a media item. For example, the media data 323$n$ may include an identifier (e.g., a name, an alphanumeric identifier, etc.) for a media item. In one embodiment, the media data 323$n$ may be included as part of the calendar data 323$b$. The media items may be provided by a user using various graphical user interfaces (GUIs) presented by the user I/O module 390 (as discussed in more detail below).

In some embodiments, the discussion data 323$m$ may include data that may indicate/represent one or more messages about an event/meeting (e.g., a discussion between users about an event/meeting). For example, the discussion data 323$m$ may include a record of chat messages exchanged between two users using the calendar platform. The discussion data 323$m$ may also include and/or refer to media data when a message includes a media item. For example, a user may transmit a message that may include a digital image of an event venue. The discussion data 323$m$ (which may represent/indicate the message) may include media data for the digital image or may refer to media data for the digital image. In one embodiment, the discussion data 323$m$ may be included as part of the client communications data 323$e$. A user may transmit/provide one or more messages using various GUIs provided by the user I/O module 390 (as discussed in more detail below).

The client device 310 may further include a user input/output module 390, which may comprise one or more hardware and/or software components for receiving user input. For example, in certain embodiments, the user I/O module 390 may comprise one or more of a keyboard, touchpad, microphone, speaker, wireless and/or wired communication controller configured to communicate according to one or more protocols, or the like. The user may utilize the user I/O module 390 to generate new calendar and/or event objects, input share IDs or other identifiers or authorization codes/values.

Although FIG. 3 illustrates a variety of visually-separate blocks representing different types of data and/or functional modules, such visual segregation is provided for convenience and any data and/or functionality shown and/or described herein may be integrated with, or separate from, any other data and/or functionality, depending on the embodiment. Furthermore, additional types of data and/or functionality not represented in FIG. 2 may be included in certain embodiments, and certain of the illustrated data types and/or functional modules may be omitted, as desired or practical, in certain embodiments.

Figure 4:
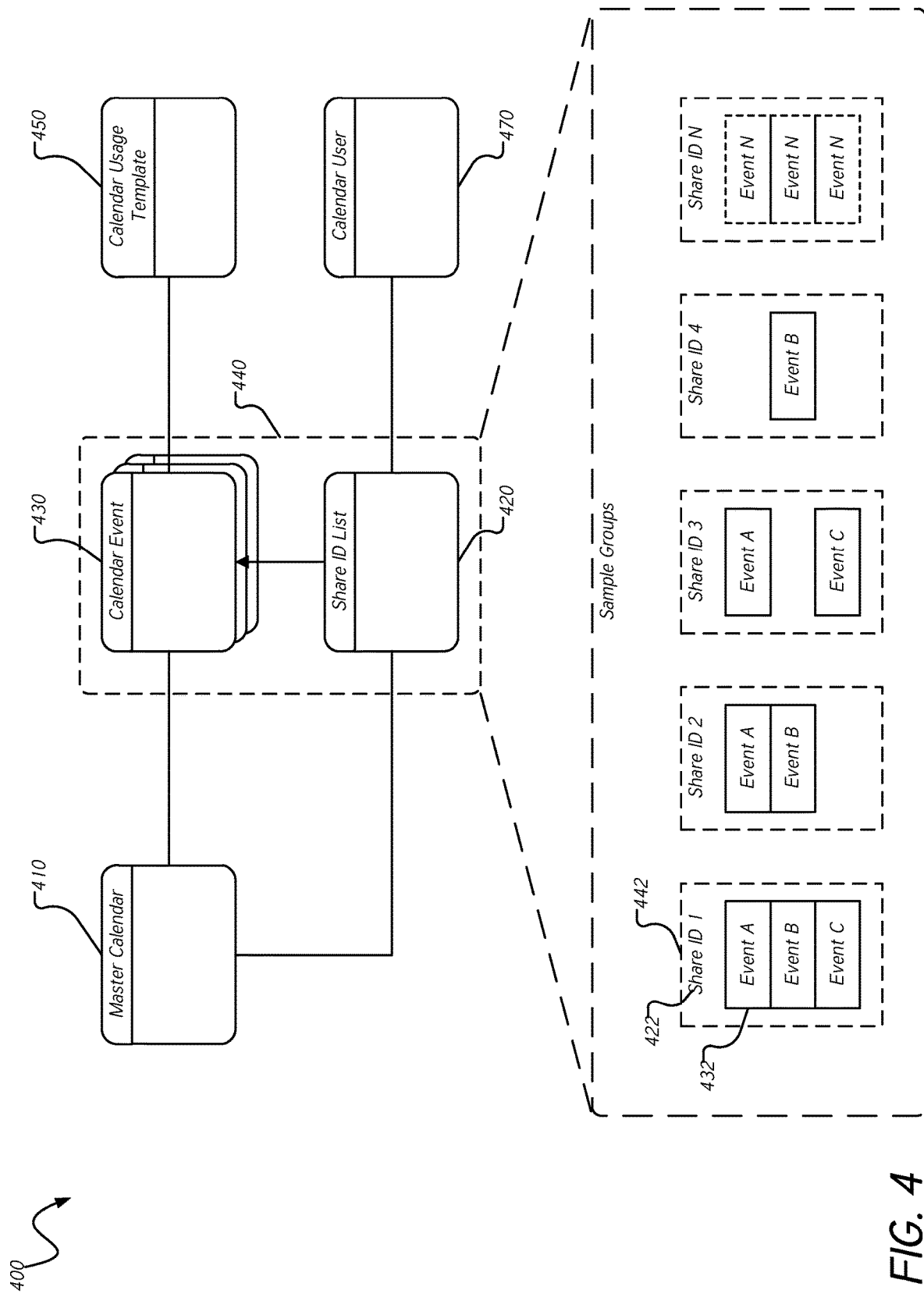
FIG. 4 is a block diagram illustrating a calendar data management system according to one or more embodiments.

FIG. 4 is a block diagram illustrating a calendar data management system 400 according to one or more embodiments. The system 400 may represent one or more embodiments of possible instances of a calendar data type which may be used in connection with one or more embodiments of calendar management systems and/or methods disclosed herein. In certain embodiments, a master calendar 410 (e.g., calendar object) may be managed by an individual user, or management may be shared among a group of users. A calendar may contain one or more calendar events 430 (e.g., calendar event objects), wherein the calendar events 430 may represent individual files, data structures, or collections of the same. Calendar events 430 may contain various parameters/attributes, such as date, time start, time end, organizer, invitees, and/or additional types of information.

In typical calendar exchanges, a calendar may be managed on a user's own calendar and then an event is shared or pushed to another user's calendar. In certain embodiments, updates to the calendar user's event may be implemented by sending another updated calendar event. In certain alternative embodiments, the calendar may be shared with a calendar user to allow access to the entire calendar. At this point, the calendar user may go to the shared calendar to access any updated information.

Here, the calendar data type may allow for calendar events 430 to be managed on a single master calendar 410 with the additional capability feature of granular visibility of calendar events. The calendar may be managed by an individual or group in similar fashion to certain traditional calendar systems. Additionally, individual calendar events or groups of calendar events 430 may be associated with individuals or groups. A usage template 450 applied to the calendar event may determine the default for whether an individual or group is associated. An instance of Share ID 422 may be associated with one or more calendar events 432 to create a unique calendar group 442 that can be shared with any calendar user or group using the Share ID 422. Individual calendar users 470, through the use of one or more Share IDs on a device, may have access to the aggregate of associated calendar events 440, while possibly not having access to the entire calendar.

Calendar Management Operation

Figure 5:
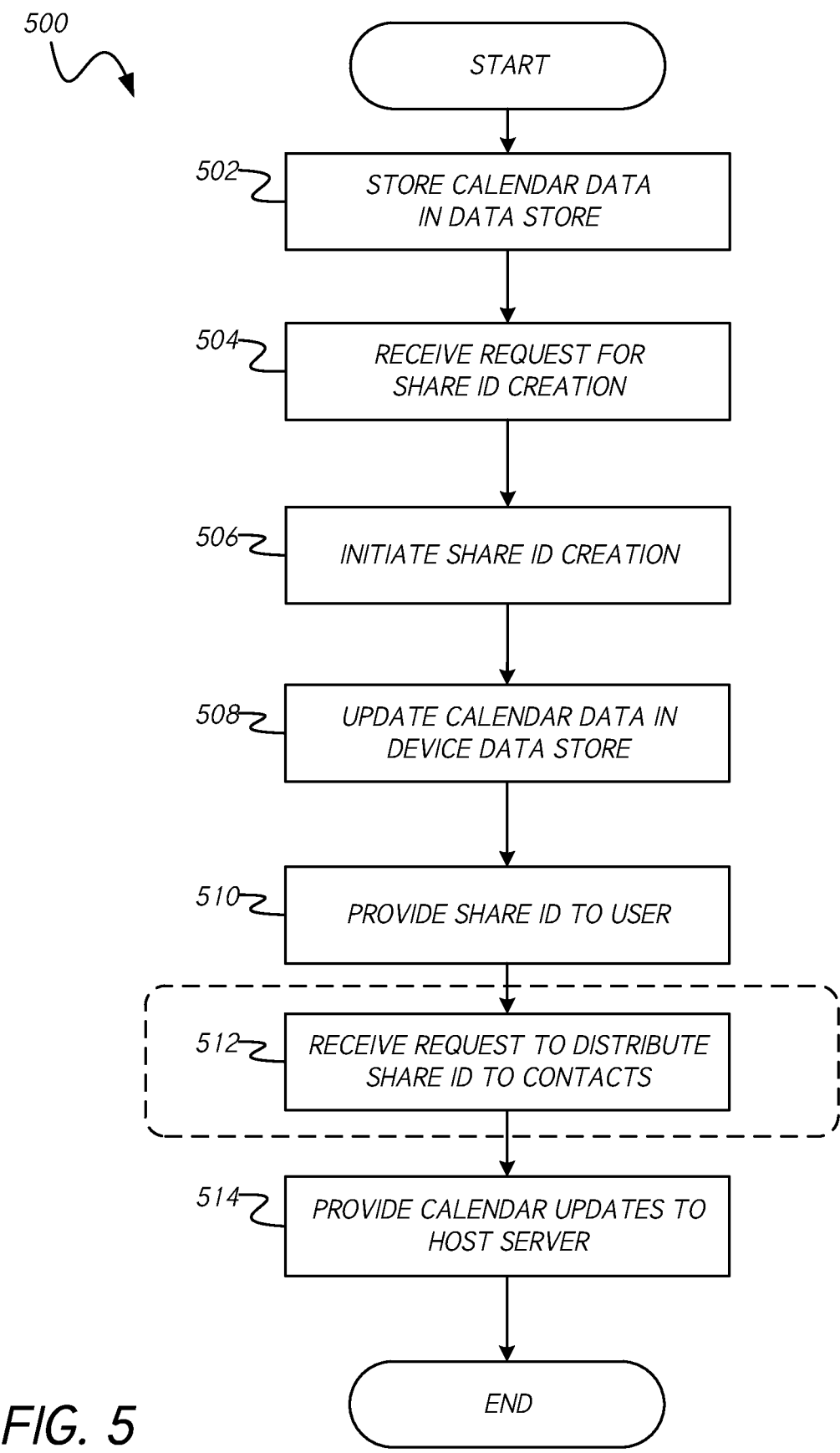
FIG. 5 is a flow diagram illustrating a process for the creation and publishing of a Share ID associated with a calendar, calendar event, and/or group of calendar events by a calendar scheduler according to one or more embodiments.

FIG. 5 is a flow diagram illustrating a process for the creation and publishing of a Share ID associated with a calendar, calendar event, and/or group of calendar events by a calendar scheduler (e.g., calendar scheduler 112) according to one or more embodiments. In certain embodiments, a calendar scheduler/user may have created and saved a calendar in a local and/or remote data store 502. As a default, a calendar object may start in a private (non-shared) state which could allow for a scheduler to make several updates before making the calendar and/or certain data associated therewith available to others. Several updates may be made to the saved calendar before moving out of this process step. After a calendar and/or group of calendar events has been created and/or identified, the process 500 may involve receiving a request for the creation of a Share ID to associate with a calendar, a calendar event, and/or group of calendar events 504. Upon receipt of the request, the system may initiate the creation of the Share ID as represented in process step 506. The Share ID creation may be processed on the device in whole, and/or may include other/additional requests provided to a host server to create and/or validate the Share ID. Upon receipt of a Share ID, the process 500 may involve the calendar system updating the calendar data in the device's data store with the new Share ID as shown in 508, and may then make the Share ID available to the calendar scheduler.

In certain embodiments, after a calendar scheduler has received a generated Share ID, a calendar scheduler may choose to distribute the Share ID via the calendar system through a selection of contacts 512, and/or a calendar scheduler may choose to distribute the Share ID via external processes. In some embodiments, the system may push a notification message directly to selected calendar users based on calendar membership information.

After a Share ID has been created and/or the calendar system has received the request to distribute the Share ID to a set of users, the device calendar system may provide the calendar update to the host server for processing, as shown in block 514. The calendar update may include calendar data and/or associated metadata, such as where a new calendar has been generated, and/or the calendar update may include changes for dissemination to the host and other devices using the Share ID.

Additional process steps may include a calendar scheduler receiving updates of Share ID use by a calendar user(s), and/or subsequent communications between client devices (e.g., client devices 110) which may or may not be associated to specific a calendar, and/or Share ID. The process 500 of FIG. 5 may be performed at least in part under the control of one or more processors or controllers of a computing device.

Figure 6:
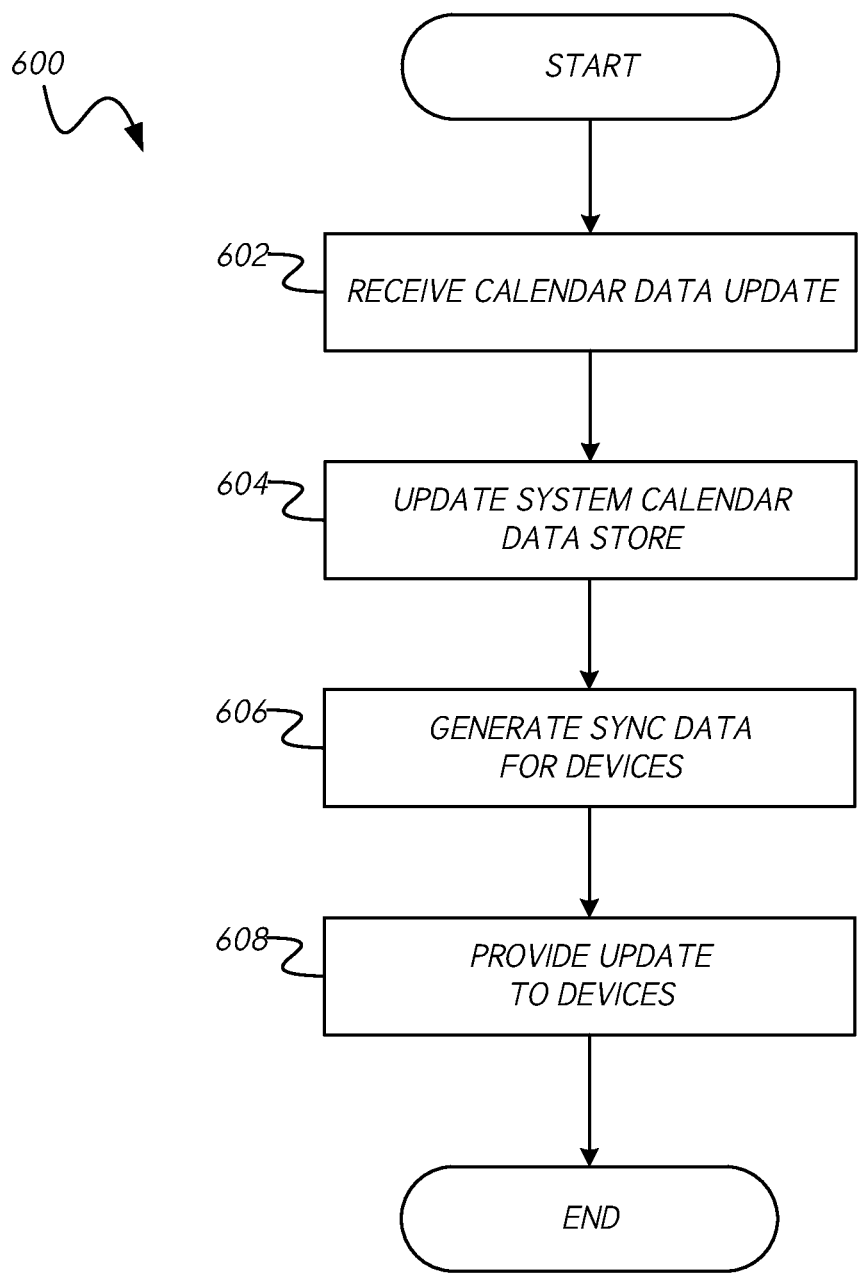
FIG. 6 is a flow diagram illustrating a process for storing and/or distributing calendar data by a host server according to one or more embodiments.

FIG. 6 is a flow diagram illustrating a process for storing and/or distributing calendar data by a host server (e.g., host server 120 in FIG. 1A) according to one or more embodiments. In certain embodiments, a host server may receive a request to update calendar data. In certain embodiments, the request may indicate a data trigger identifying the need to update other user/device calendars. A request may come from a calendar scheduler, calendar user (e.g., calendar user 114), other calendar system(s), and/or other servers/services. Calendar data may be converted into calendar system data types if received from a different calendar system format through by an integration management module, for example. In one embodiment, the request may include and/or refer to media data and/or discussion data. For example, if a user adds one or more media items to an event/meeting, the event/meeting (e.g., the event object) may be updated to include media data for the one or more media items. In another example, if a user transmits a message (e.g., a chat message) about an event/meeting, the event/meeting (e.g., the event object) may be updated to include the discussion data.

An update to calendar data may contain calendar data for a new calendar (e.g., calendar object), and/or updates to a current calendar, as specified. After receipt and/or possible conversion of calendar data formats, the calendar data may be updated in the system calendar data store 604.

After the system calendar data store is updated, the calendar system may generate synchronization data (block 606) to be distributed to client devices. For example, synchronization data may comprise a set of notifications to push to users via a sockets service list and/or associated targets for calendar ID. The notification on the client device may trigger a pull of the calendar data. Synchronization data may include, but would not be limited to, notification messages, calendar change history, summarized calendar data, and/or other data. In certain embodiments, this data may be substantially immediately processed by the system, such as where the client devices are actively connected to the calendar system and an immediate push of calendar data updates is desired or possible, such as through the use of sockets and a target list of active users/devices. In certain other embodiments, this process step may not be immediate, and/or instead triggered by a calendar user request for an update of calendar data.

After synchronization data has been created, the system may provide calendar data updates to a client device as identified by the Share ID in process step 608. A calendar user requesting calendar data may be provided updates according to one or more identified Share ID(s). The process 600 of FIG. 6 may be performed at least in part under the control of one or more processors or controllers of a computing device.

Figure 7:
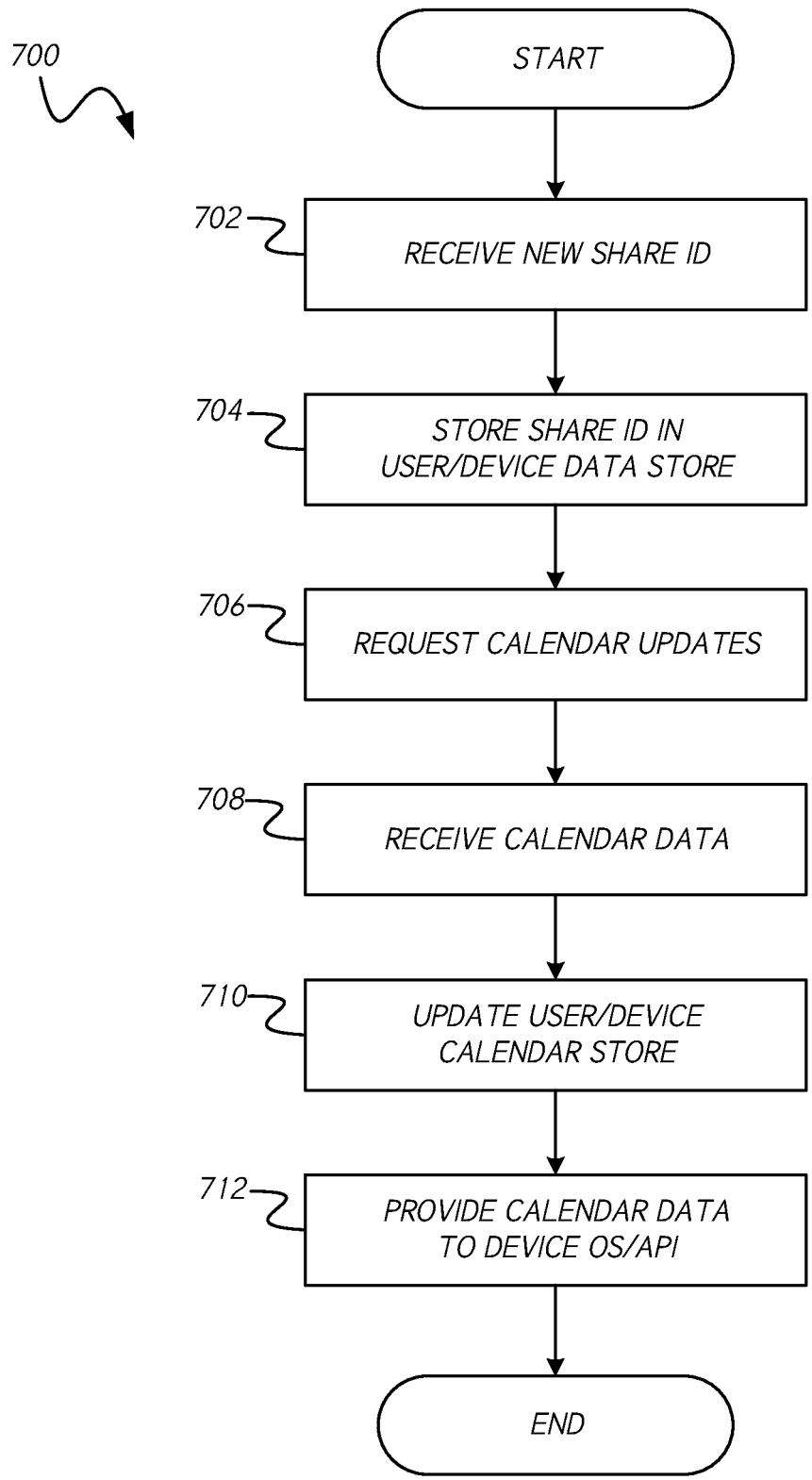
FIG. 7 is a flow diagram illustrating a process for the use of a Share ID by a calendar user associate one or more calendars to a client device according to one or more embodiments.

FIG. 7 is a flow diagram illustrating a process for the use of a Share ID by a calendar user associate one or more calendars to a client device according to one or more embodiments. In step 702, a Share ID is received by the calendar system on a client device. In certain embodiments, the receipt of a Share ID may be via the calendar system whereas in other certain embodiments, the receipt of a Share ID may be initiated via calendar user entry, and/or other process.

Upon receipt of a new Share ID, the calendar system may store the Share ID in the device's local data store 704 for persistent storage of calendar Share IDs.

After update of the data store with a new Share ID, a device's calendar system may request calendar updates from a host server and/or other server/service, as shown in block 706. In certain embodiments, the request for calendar updates may be initiated by a calendar user, and/or autonomously by the calendar system. The request for calendar updates may include one or more Share ID(s). In addition to providing initial calendar information, the host server may provide the device and Share ID information to synchronization and/or communication modules for immediate registration for future calendar updates.

In step 708, a device's calendar system receives calendar data as possibly determined by the synchronization and communication modules. Upon receipt of calendar data, the calendar system may convert the calendar data into a calendar system data type. In certain embodiments, a conversion of data into a device's native calendar data type may occur where an update of a device's native calendar system is desired. After receipt and/or possible data conversion, the calendar system may store the calendar data to the device's calendar data store in step 710. In certain embodiments, schedule conflict alerts may be raised to the user at this time for resolution. In one embodiment, media data and/or discussion data may be included as part of the calendar data. Media data identifies one or more media items associated with an event/meeting and discussion data represents one or more messages (e.g., a discussion) for an event/meeting, as discussed above.

In the next step 712, the calendar system provides the calendar data to the device OS/API for possible further processing such as user notification, device event context updates, and/or native calendar updates.

In certain embodiments, additional process steps may include client communications such as secondary distribution of Share ID(s), text and/or video messaging, device location information, device calendar status receipt, external system notifications, and/or account maintenance activities. The process 700 of FIG. 7 may be performed at least in part under the control of one or more processors or controllers of a computing device.

Figure 8:
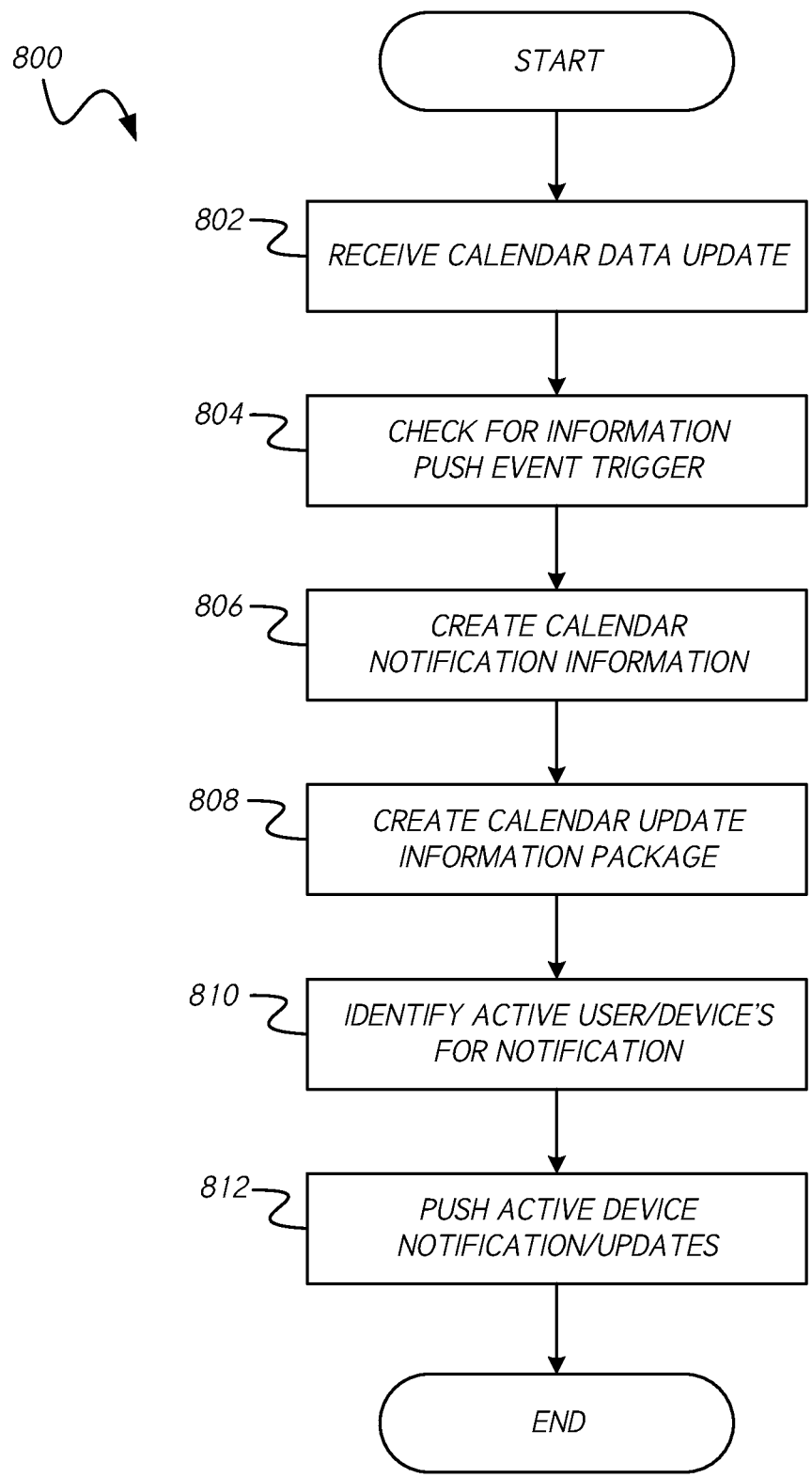
FIG. 8 is a flow diagram illustrating a process for the refresh of calendar information on multiple devices by an event trigger, notification and update according to one or more embodiments.

FIG. 8 is a flow diagram illustrating a process for the refresh of calendar information on multiple devices by an event trigger, notification and update according to one or more embodiments. In step 802, the system has received an update of information for a specific event, group of events, calendar, and/or group of calendars. The system update may be anywhere the calendar information has been persisted. The update of information may be to calendar specific information and/or to calendar metadata as determined by specific embodiment. In some embodiments, the update of information may include media data and/or discussion data.

In step 804, the system checks for a combination of information elements determined to require and/or desire an update of information on any other user/client device. For example, in some embodiments the triggering information may be a calendar status change to a "published" state, change to a calendar event time/location, and/or a preset time duration interval from a prior update status. In another example, adding media data (e.g., adding a new media item to an event/discussion), modifying media data (e.g., changing media items associated with an event/discussion), and/or adding discussion data (e.g., adding one or more messages to a discussion for an event/meeting) may be triggers/triggering information. Multiple combinations of event triggers may be configured as needed to achieve an appropriate balance between resource utilization and immediate information availability and refresh frequency.

Once the requirement for a calendar update has been made, step 806 depicts the creation of appropriate notification information based on the notification event triggering parameters. In some embodiments, the notification information may be tailored as desired for individual user/device consumption or otherwise maintained at the calendar/event level.

In step 808, the creation of a calendar update information package in an embodiment represents the preparation of a set of calendar information for delivery to user/devices. Creation of an update information package may be done in any way to facilitate the refresh of calendar information appropriate to the triggering event determined in 804. In some embodiments, the range of information package data may be from an incremental change information package and/or through a complete refresh of calendar information. The information package will contain all information required by a user/device to be in sync with the calendar information as per calendar update.

Upon package of calendar update information, the system will identify and verify any active user/devices to be targeted for calendar update notification and information update in step 810. An example of such identification could be to gather a status on users/devices in current communication to the system. The determination of an "active" user/device may be based on the end-to-end communication platform available between devices and may be tailored as such to maximize efficacy.

In step 812, the system will transmit the calendar update information package as has been determined for a specific user/device as identified by step 810. Whether synchronous or asynchronous communications is used may be determined by embodiment and communication platform implementation.

In some embodiments, the user/device may continue according to general device update processing similar to that shown in step 708.

Figure 9:
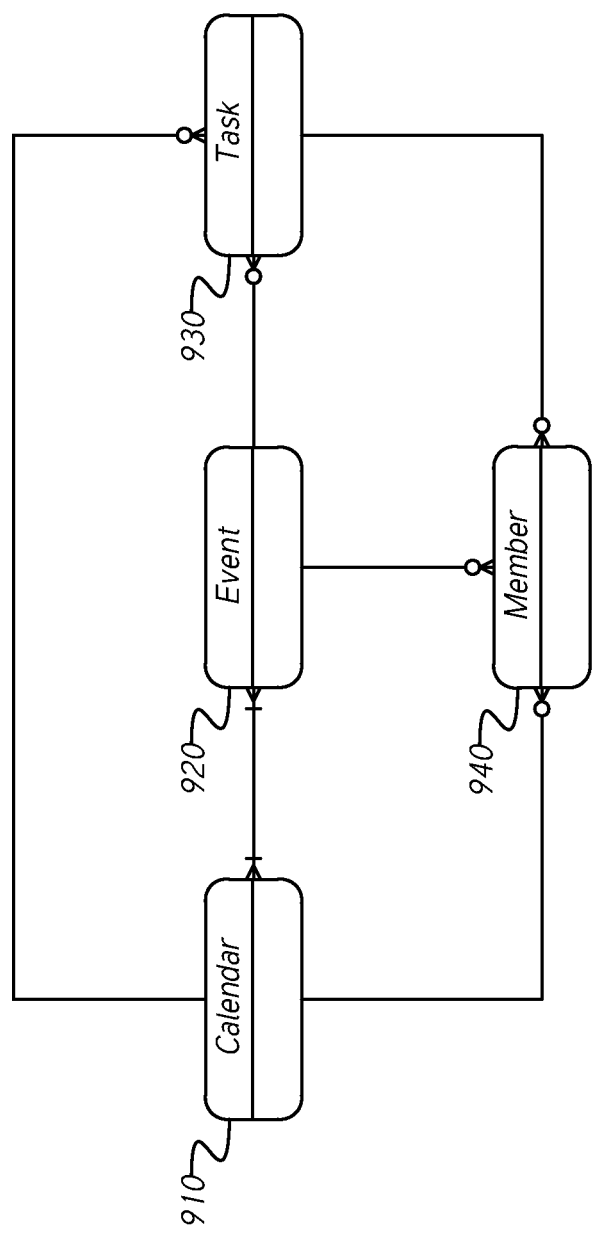
FIG. 9 is an entity-relationship diagram illustrating a conceptual modelling the relationship amongst calendar, events, tasks, and members entities according to one or more embodiments.

FIG. 9 is an entity-relationship diagram illustrating a conceptual modelling the relationship amongst calendar, events, tasks, and members entities according to one or more embodiments.

The calendar 910 may represent one or more embodiments of possible instances of a calendar entity which may be used in connection with one or more embodiments of calendar management systems and/or methods disclosed herein. In certain embodiments, a calendar 910 may represent a single instance of a calendar or may represent a group of one or more individual calendar instances. A calendar may have an association to one or more events 920. A calendar may also have an association to one or more tasks 930 and an association to one or more members 940.

The event 920 may represent one or more embodiments of possible instances of an event entity which may be used in connection with one or more embodiments of calendar management systems and/or methods disclosed herein. In certain embodiments, an event 920 may represent a single instance of an event or may represent a group of one or more individual event instances. An event may have an association to one or more calendars 910. An event may also have an association to one or more tasks 930 and an association to one or more members 940.

The task 930 may represent one or more embodiments of possible instances of a calendar entity which may be used in connection with one or more embodiments of calendar management systems and/or methods disclosed herein. In certain embodiments, a task 910 may represent a single instance of a task or may represent a group of one or more individual task instances. A task may have an association to one or more calendars 910. A task may also have an association to one or more events 920 and an association to one or more members 940.

The member 940 may represent one or more embodiments of possible instances of a calendar entity which may be used in connection with one or more embodiments of calendar management systems and/or methods disclosed herein. In certain embodiments, a member 940 may represent a single instance of a member or may represent a group of one or more individual member instances. A member may have an association to one or more calendars 910. A member may also have an association to one or more events 920 and an association to one or more tasks 930.

Figure 10:
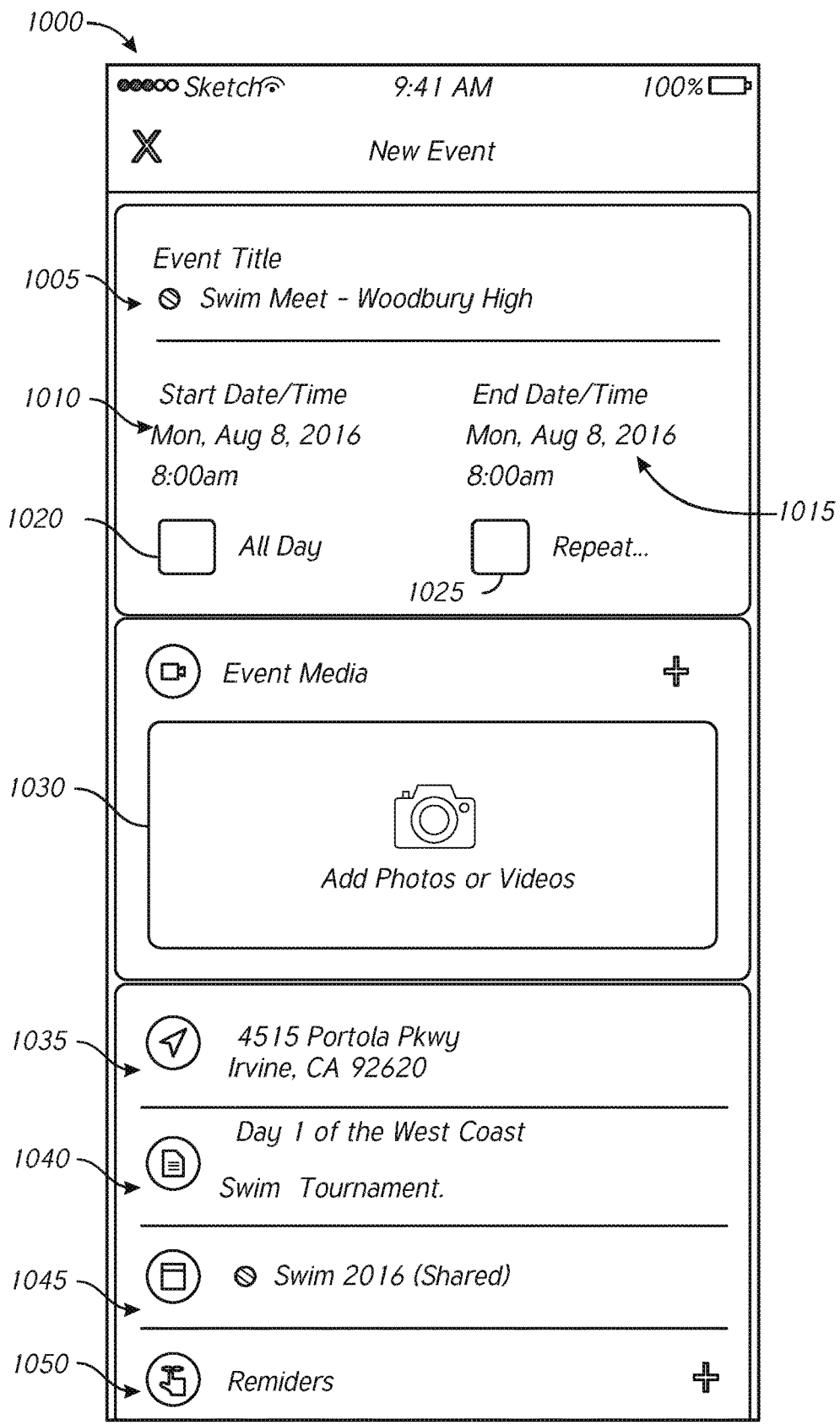
FIG. 10 is a diagram illustrating an example graphical user interface (GUI) according to one or more embodiments.

FIG. 10 is a diagram illustrating an example GUI 1000 according to one or more embodiments. In one embodiment, the GUI 1000 may be an interface for creating a new event/meeting and/or modifying an existing event/meeting. The GUI 1000 may be presented by a calendar application (e.g., an app, an application, a program, a software module/component, etc.) that may allow a user to create/modify events/meetings and may be used to invite other users to the event/meeting. The calendar application (e.g., app) may be executing/operating on a computing device (e.g., a client device) of a user (e.g., a smartphone, a tablet computer, etc.). In another embodiment, the GUI 1000 may be a webpage provided/presented by a calendar platform. For example, the GUI 1000 may be presented by and/or displayed within a web browser when the user accesses or logs into a calendar platform via the web browser. The GUI 1000 includes a buttons 1005, 1010, 1015, 1030, 1035, 1040, 1045, and 1050. The GUI 1000 also includes checkboxes 1020 and 1025. Although the GUI 1000 is illustrated using buttons, checkboxes, text fields, etc., one having ordinary skill in the art understands that other embodiments may use links and/or other graphical user interface controls or elements in place of one or more of the buttons, checkboxes, text fields, etc.

Button 1005 may allow the user to specify a name for the event (and/or to modify the name for the event). Activating (e.g., pressing, clicking, tapping, etc.) button 1005 may cause the GUI 1000 to present a text field that may allow the user to specify/modify the name for the event. Buttons 1010 and 1015 may allow the user to specify/modify a start time and an end time for the event, respectively. Activating button 1010 or button 1015 may cause the GUI 1000 to present a text field or another GUI that displays a monthly calendar, to allow the user to specify/modify the start time or end time.

Activating button 1035 may cause GUI 1000 to present a text field or a map that may allow the user to specify/modify the location for the meeting/event. Activating button 1040 may cause the GUI 1000 to present a text field to allow the user to specify/modify notes and/or other information about the event/meeting (e.g., the purpose of the meeting, an agenda, items to bring to the meeting, etc.). Activating button 1045 may cause the GUI 1000 to present a list of calendars that may include the event/meeting. This may allow the calendar platform to associate the meeting/event (or the event object for the meeting/event) with different calendars (or calendar objects). Activating button 1050 may cause the GUI 1000 to present a monthly calendar, a clock, a text field, etc., that may allow the user to specify a time for a reminder (for the event/meeting).

Activating button 1030 may cause the GUI 1000 to present buttons, lists, text fields, other user interface elements, etc., to allow the user to indicate one or more media items that should be included in and/or associated with the event/meeting (which are discussed in more detail below). This may allow the user to provide more information about the event/meeting in the event object. For example, including media items may allow the user to provide video/pictures of an event venue, video/pictures of speakers/attendees of the event, video/pictures of food that will be provided at the event, etc. As discussed above, a media item may be content such as digital video, digital images, digital audio, text, etc.

Figure 11:
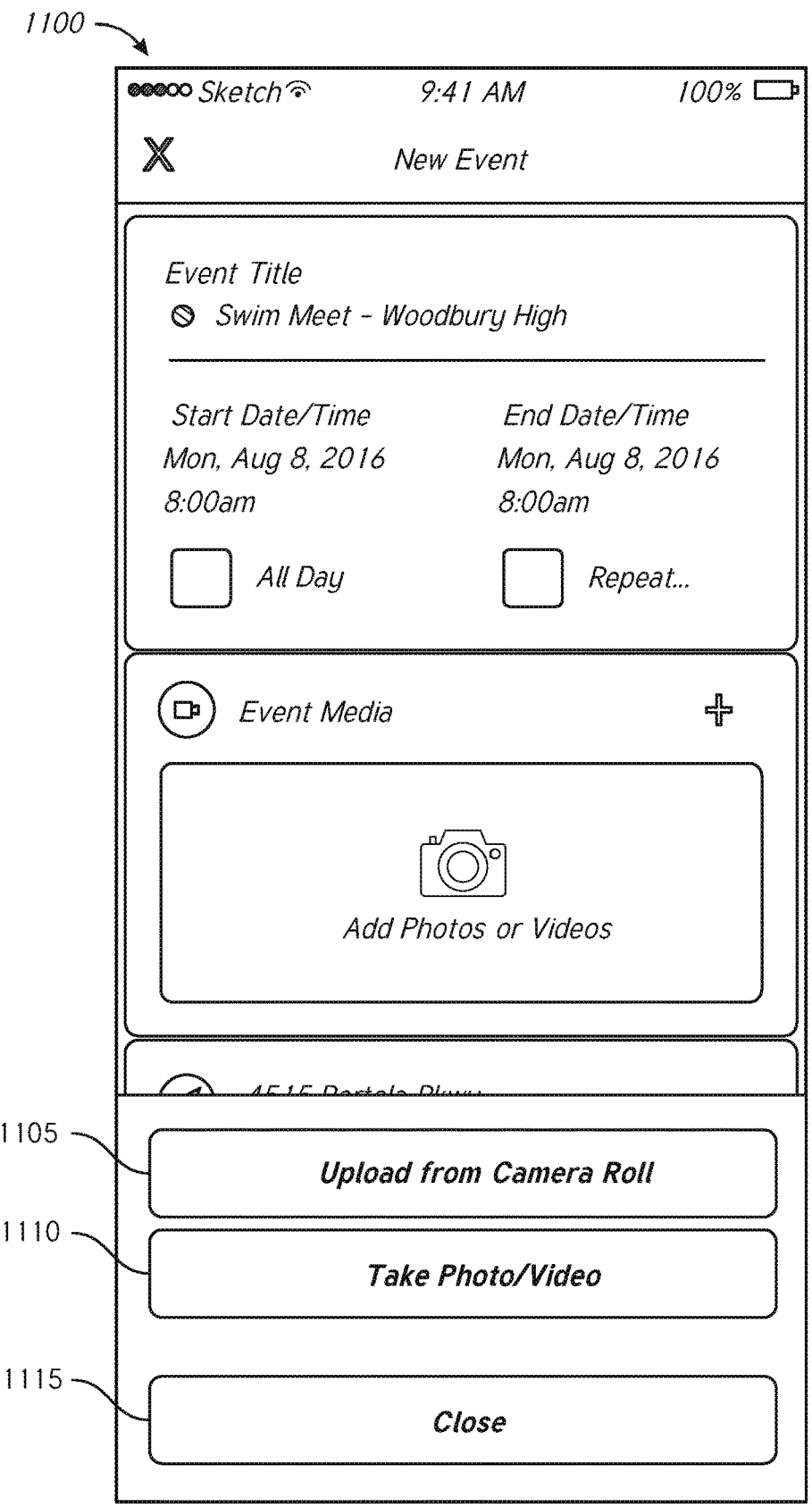
FIG. 11 is a diagram illustrating an example GUI according to one or more embodiments.

FIG. 11 is a diagram illustrating an example GUI 1100 according to one or more embodiments. In one embodiment, the GUI 1100 may be an interface for selecting one or more media items to be included in and/or associated with an event/meeting. The GUI 1100 may be presented by a calendar application (e.g., an app, an application, a program, a software module/component, etc.) executing on a user's computing device, as discussed above. In another embodiment, the GUI 1100 may be a webpage provided/presented by a calendar platform, as discussed above. The GUI 1100 includes a buttons 1105, 1110, and 1115. Although the GUI 1100 is illustrated using buttons, one having ordinary skill in the art understands that other embodiments may use links and/or other graphical user interface controls or elements in place of one or more of the buttons.

As discussed above, a user may want to include one or more media items (e.g., videos, images, audio, etc.) in an event/meeting that has been scheduled on one or more calendars. The GUI 11100 may be presented when the user activates (e.g., clicks, taps, selects, presses, etc.) button 1030 illustrated in FIG. 10. Activating button 1105 may allow the user to select one or more media items from that are stored on the user's computing device (e.g., that are stored on the user's smartphone or tablet computer). In one embodiment, a media viewer application (e.g., a default "camera roll") of the device may be presented when the user activates button 1105. In another embodiment, the GUI 1100 may present another user interface that allows the user to view/select media items stored on the user's computing device (e.g., the calendar app may include a media viewer/selector).

Activating button 1110 may allow the user to create one or more new media items (e.g., to take a picture and/or record a video). In one embodiment, a camera application (e.g., a default camera app on a smartphone/tablet computer) may be presented when the user activates button 1110. In another embodiment, the GUI 1100 may present another user interface to take one or more pictures/videos (e.g., the calendar app may include a camera app). Activating button 1115 may allow the user to return to the previous GUI (e.g., GUI 1000 illustrated in FIG. 10).

Figure 12:
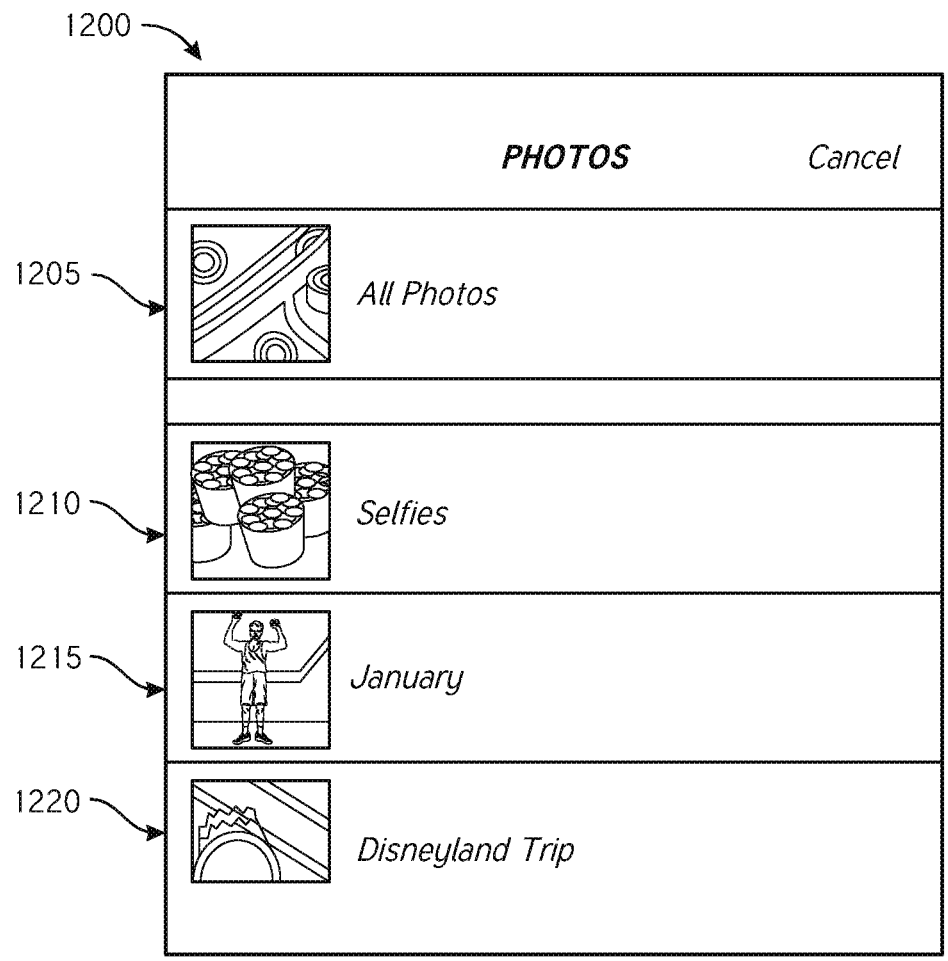
FIG. 12 is a diagram illustrating an example GUI according to one or more embodiments.

FIG. 12 is a diagram illustrating an example GUI 1200, in accordance with some embodiments of the present disclosure. In one embodiment, the GUI 1200 may be an interface for selecting one or more media items to be included in and/or associated with an event/meeting. The GUI 1200 may be presented by a media viewer/player application (e.g., an app, an application, a program, a software module/component, etc.) executing on a user's computing device, as discussed above. The GUI 1200 includes buttons 1205, 1210, 1215, and 120. Although the GUI 1200 is illustrated using buttons, one having ordinary skill in the art understands that other embodiments may use links and/or other graphical user interface controls or elements in place of one or more of the buttons. The GUI 1200 may be presented by a media player/viewer application (e.g., a "camera roll"). The media player/viewer application may be a separate application or may be part of the calendar application.

Activating button 1205 (e.g., the "All Photos" button) may allow the user to view a list (e.g., a complete list) of all of the media items (e.g., videos, pictures, etc.) that are stored on the user's computing device. For example, activating button 1205 may cause a list of thumbnails to be presented to the user. The thumbnails may be previews of the videos and/or images that are stored on the user's computing devices. As illustrated in FIG. 12, the button 1205 may include a thumbnail (e.g., preview) of one or more of the media items that are stored in the user's computing device. Activating one of the buttons 1210, 1215, or 1220 may allow the user to view different groups (e.g., albums) of media items. For example, activating button 1210 may allow the user to view a list of media items (e.g., videos and/or pictures) that are in the "Selfies" group/album. Each of the buttons 1210, 1215, and 1220 may also include a thumbnail of one or more media items that are in a respective group/album. For example, button 1215 may include a thumbnail of one or more media items in the "January" group/album.

The groups/albums illustrated in FIG. 12 are merely examples. One having ordinary skill in the art understands that that a user's computing device may include fewer or more albums and that the albums may sort media items various factors/criteria such as time, location, subject matter, user preferences, etc.

Figure 13:
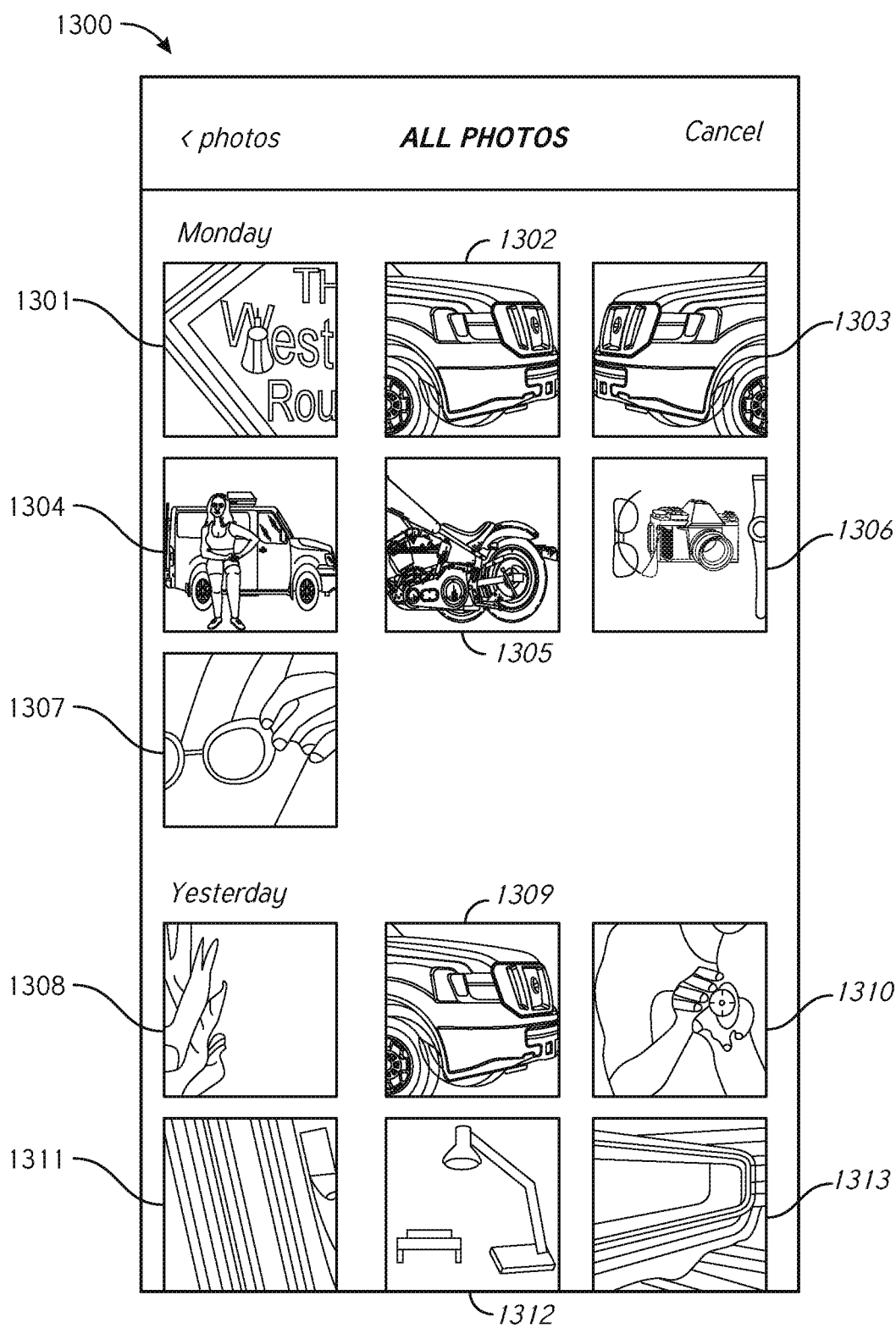
FIG. 13 is a diagram illustrating an example GUI according to one or more embodiments.

FIG. 13 is a diagram illustrating an example GUI 1300, in accordance with some embodiments of the present disclosure. In one embodiment, the GUI 1300 may be an interface for selecting one or more media items to be included in and/or associated with an event/meeting. The GUI 1300 may be presented by a media viewer/player application (e.g., an app, an application, a program, a software module/component, etc.) executing on a user's computing device, as discussed above. The GUI 1300 may be presented when the user activates button 1205 (illustrated in FIG. 12). The GUI 1300 includes a plurality of thumbnails 1301-1313 (e.g., previews of media items). In one embodiment, each of the thumbnails 1301-1313 may function as a checkbox and/or a button. Although the GUI 1300 is illustrated using thumbnails, buttons, checkboxes, etc., one having ordinary skill in the art understands that other embodiments may use links and/or other graphical user interface controls or elements in place of one or more of the thumbnails, buttons, checkboxes, etc. The GUI 1300 may be presented by a media player/viewer application (e.g., a "camera roll"). The media player/viewer application may be a separate application or may be part of the calendar application.

Each of the thumbnails 1301-1313 illustrated in FIG. 13 may represent a media item that is stored on the user's computing device. As illustrated in FIG. 13, the top seven thumbnails 1301-1307 may represent media items (e.g., pictures) on the user's computing device that were created on Monday. The bottom six thumbnails 1308-1313 may represent media items that were created Sunday (i.e., Yesterday). The thumbnails 1301-1313 may allow the user to select one or more media items to include in an event/meeting for one or more calendars. For example, the thumbnails 1301-1313 may allow the user to select a video of a meeting venue for an event/meeting. In one embodiment, the user may activate (e.g., block, press, tap, tap and hold, etc.) a thumbnail to select the media item represented by the thumbnail, as discussed in more detail below.

Figure 14:
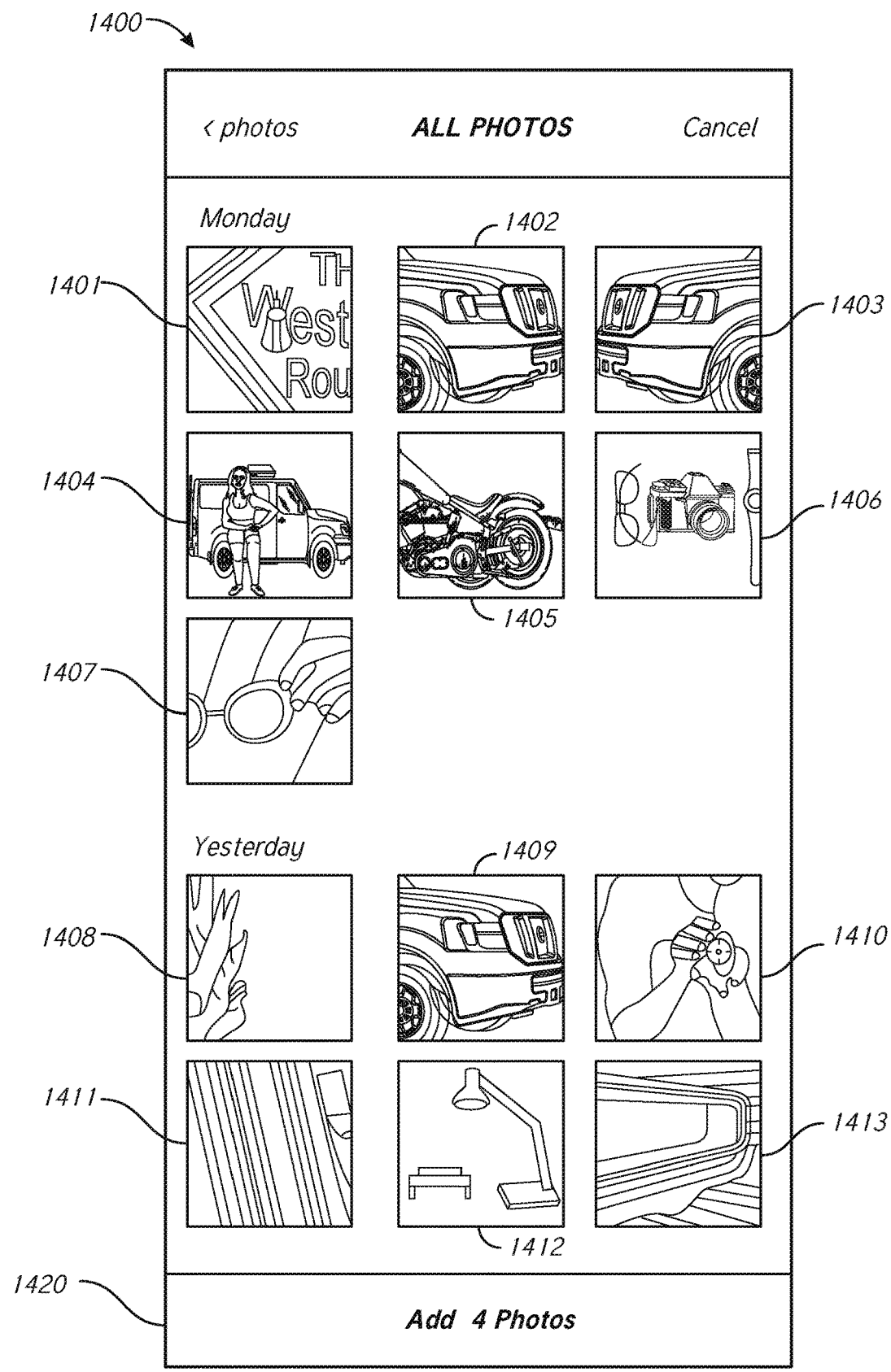
FIG. 14 is a diagram illustrating an example GUI according to one or more embodiments.

FIG. 14 is a diagram illustrating an example GUI 1400, in accordance with some embodiments of the present disclosure. In one embodiment, the GUI 1400 may be an interface for selecting one or more media items to be included in and/or associated with an event/meeting. The GUI 1400 may be presented by a media viewer/player application (e.g., an app, an application, a program, a software module/component, etc.) executing on a user's computing device, as discussed above. The GUI 1400 may be presented when the user activates one or more thumbnails. The GUI 1400 includes a plurality of thumbnails 1401-1413 (e.g., previews of media items) and button 1420. In one embodiment, each of the thumbnails 1401-1413 may function as a checkbox and/or a button. Although the GUI 1400 is illustrated using thumbnails, buttons, checkboxes, etc., one having ordinary skill in the art understands that other embodiments may use links and/or other graphical user interface controls or elements in place of one or more of the thumbnails, buttons, checkboxes, etc. The GUI 1400 may be presented by a media player/viewer application (e.g., a "camera roll"). The media player/viewer application may be a separate application or may be part of the calendar application.

Each of the thumbnails 1401-1413 illustrated in FIG. 14 may represent a media item that is stored on the user's computing device, as discussed above. As illustrated in FIG. 14, the user has selected thumbnails 1401, 1405, 1407 and 1409. This may indicate that the user wants to include the media items represented by the thumbnails 1401, 1405, 1407 and 1409, to be included in an event/meeting that is in one or more calendars. The GUI 1400 may allow the user to select additional media items (by activating additional thumbnails) or by unselecting a media item (by activating one of thumbnails 1401, 1405, 1407, or 1409). When the user is done selecting/unselecting thumbnails, the user may activate (e.g., press, tap, click etc.) button 1420. Activating button 1420 may cause the calendar application (or webpage) to store the selected media items on one or more servers. For example, the calendar application may store the selected media items (represented by thumbnails 1401, 1405, 1407, and 1409) on a storage server.

Figure 15:
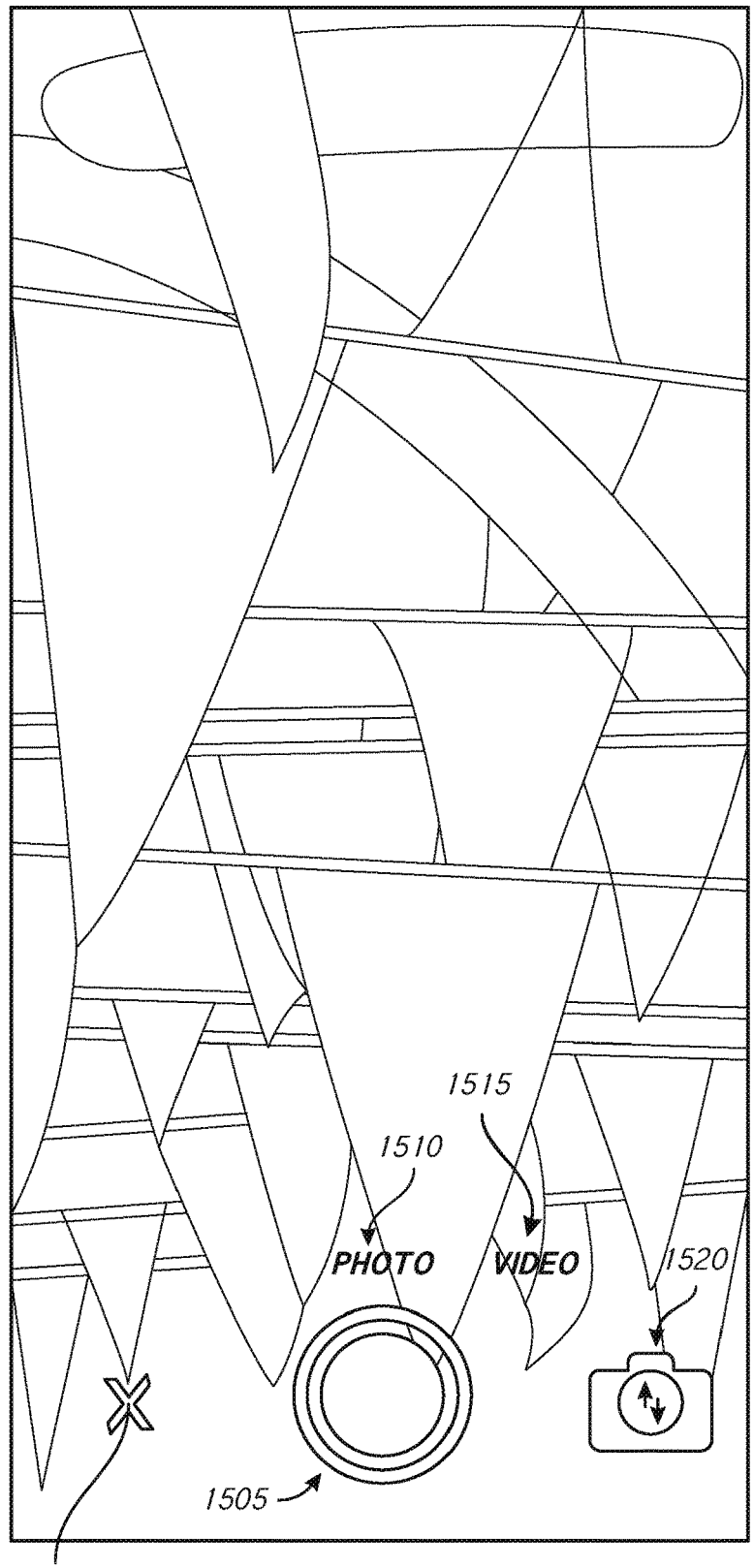
FIG. 15 is a diagram illustrating an example GUI according to one or more embodiments.

FIG. 15 is a diagram illustrating an example GUI 1500, in accordance with some embodiments of the present disclosure. In one embodiment, the GUI 1500 may be an interface for creating a new media item to be included in and/or associated with an event/meeting. The GUI 1500 may be presented by a camera application (e.g., an app, an application, a program, a software module/component, etc.) executing on a user's computing device, as discussed above. The GUI 1500 may be presented when the user activates button 1110 illustrated in FIG. 11. The GUI 1500 includes buttons 1505, 1510, 1515, 1520, and 1525. Although the GUI 1500 is illustrated using buttons, one having ordinary skill in the art understands that other embodiments may use links and/or other graphical user interface controls or elements in place of one or more of the buttons. The GUI 1500 may be presented by a camera application (e.g., a camera app) on the user device. The media player/viewer application may be a separate application or may be part of the calendar application.

The GUI 1500 may display the images/video that are captured by the camera and/or camera application of a user device. Activating (e.g., pressing, clicking, tapping, etc.) button 1510 may allow a user to capture an image (e.g., take a picture, create a media item) when the button 1505 is activated. Activating button 1515 may allow the user to capture a video (e.g., take a video, create a media item) when the button 1505 is activated. Activating 1505 may allow a user to take a picture and/or a video, based on whether button 1510 or button 1515 is activated. Activating button 1520 may allow the user to switch between using a forward-facing camera or a rear-facing camera of the computing device. Activating button 1525 may allow the user to return to a previous user interface (e.g., GUI 1100 illustrated in FIG. 11).

Figure 16:
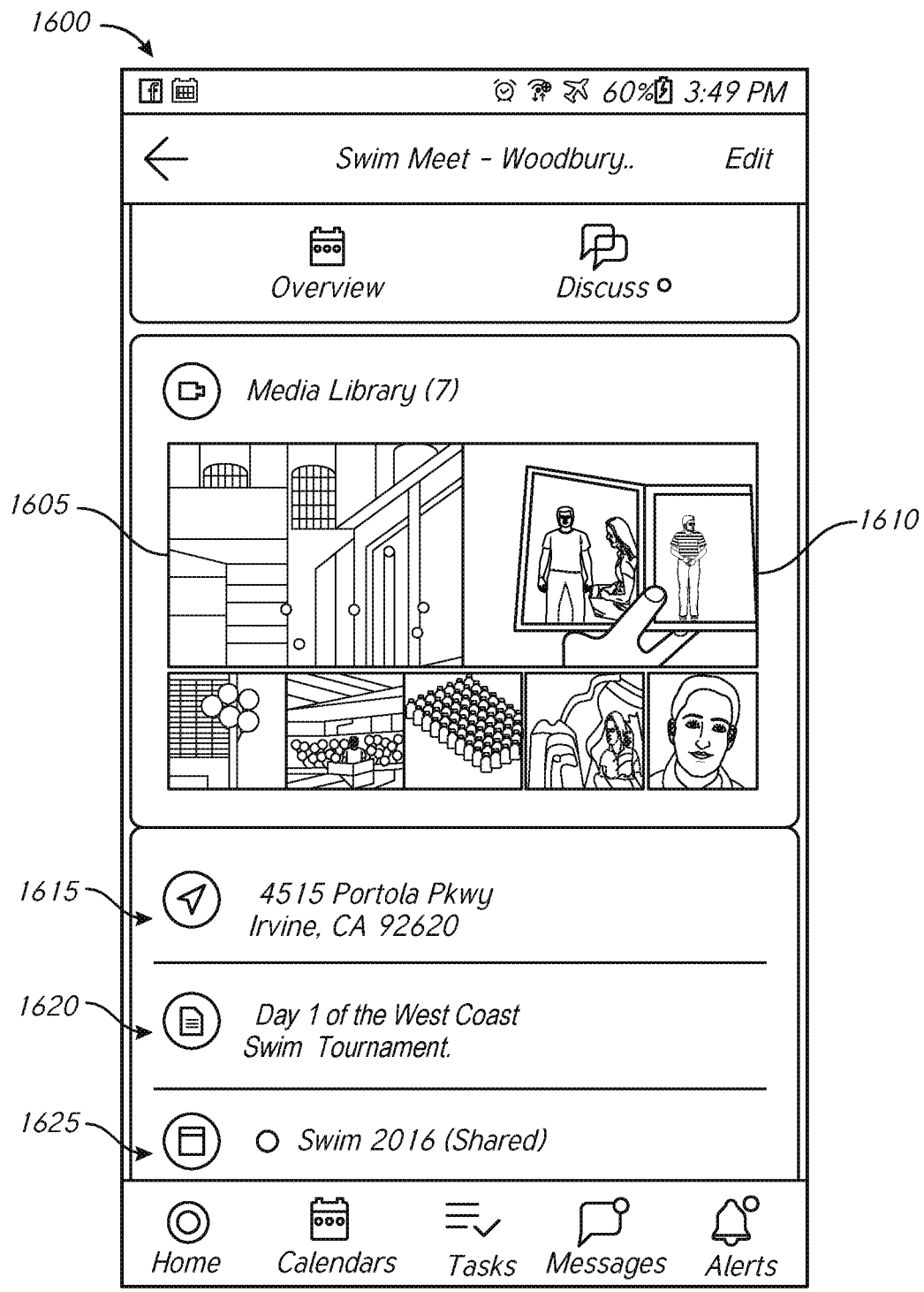
FIG. 16 is a diagram illustrating an example GUI according to one or more embodiments.

FIG. 16 is a diagram illustrating an example GUI 1600 according to one or more embodiments. In one embodiment, the GUI 1600 may be an interface for creating a new event/meeting and/or modifying an existing event/meeting. The GUI 1600 may be presented by a calendar application (e.g., an app, an application, a program, a software module/component, etc.) that may allow a user to create/modify events/meetings and may be used to invite other users to the event/meeting. The calendar application (e.g., app) may be executing/operating on a computing device of a user (e.g., a smartphone, a tablet computer, etc.). In another embodiment, the GUI 1600 may be a webpage provided/presented by a calendar platform. For example, the GUI 1600 may be presented by and/or displayed within a web browser when the user accesses or logs into a calendar platform via the web browser. The GUI 1600 includes various thumbnails (including thumbnails 1605 and 1610) and buttons 1615, 1620, and 1625. Although the GUI 1600 is illustrated using buttons, thumbnails, etc., one having ordinary skill in the art understands that other embodiments may use links and/or other graphical user interface controls or elements in place of one or more of the buttons, thumbnails, etc.

The GUI 1600 may present information about an event/meeting (e.g., a "Swim Meet") that has been created for one or more calendars. Button 1615 may allow a user to specify a location (e.g., a new location) for the event/meeting. Button 1615 may also provide information about the current location of the event/meeting (e.g., the button 1615 may indicate the address "4515 Portola Pkwy, Irvine, Calif. 92620"). Button 1620 may allow a user to provide additional information (e.g., notes, an agenda, etc.) for the event/meeting. Button 1625 may indicate one or more calendars that include the event/meeting indicated in GUI 1600.

As illustrated in FIG. 16, the GUI 1600 includes a plurality of thumbnails. The thumbnails may represent media items that have been associated with the event/ meeting by a user (e.g., an administrator, a creator of the event/meeting, etc.). The user may activate one of the thumbnails to view the media item represented by a corresponding thumbnail. For example, when the user activates thumbnail 1605, a media player/viewer application may be presented to the user. The media player/view application may play the movie (e.g., media item) that is represented by thumbnail 1605. In another example, when the user activates thumbnail 1610, the media player/viewer may display the picture (e.g., media item) that is represented by thumbnail 1610. In one embodiment, the media items may be accessed from storage server (e.g., a cloud storage platform) to display/present the media item to the user. For example, a video may be streamed from the storage server when the user activates thumbnail 1605. In another example, a picture (e.g., an image) may be downloaded from the storage server when the user activates thumbnail 1610.

Figure 17:
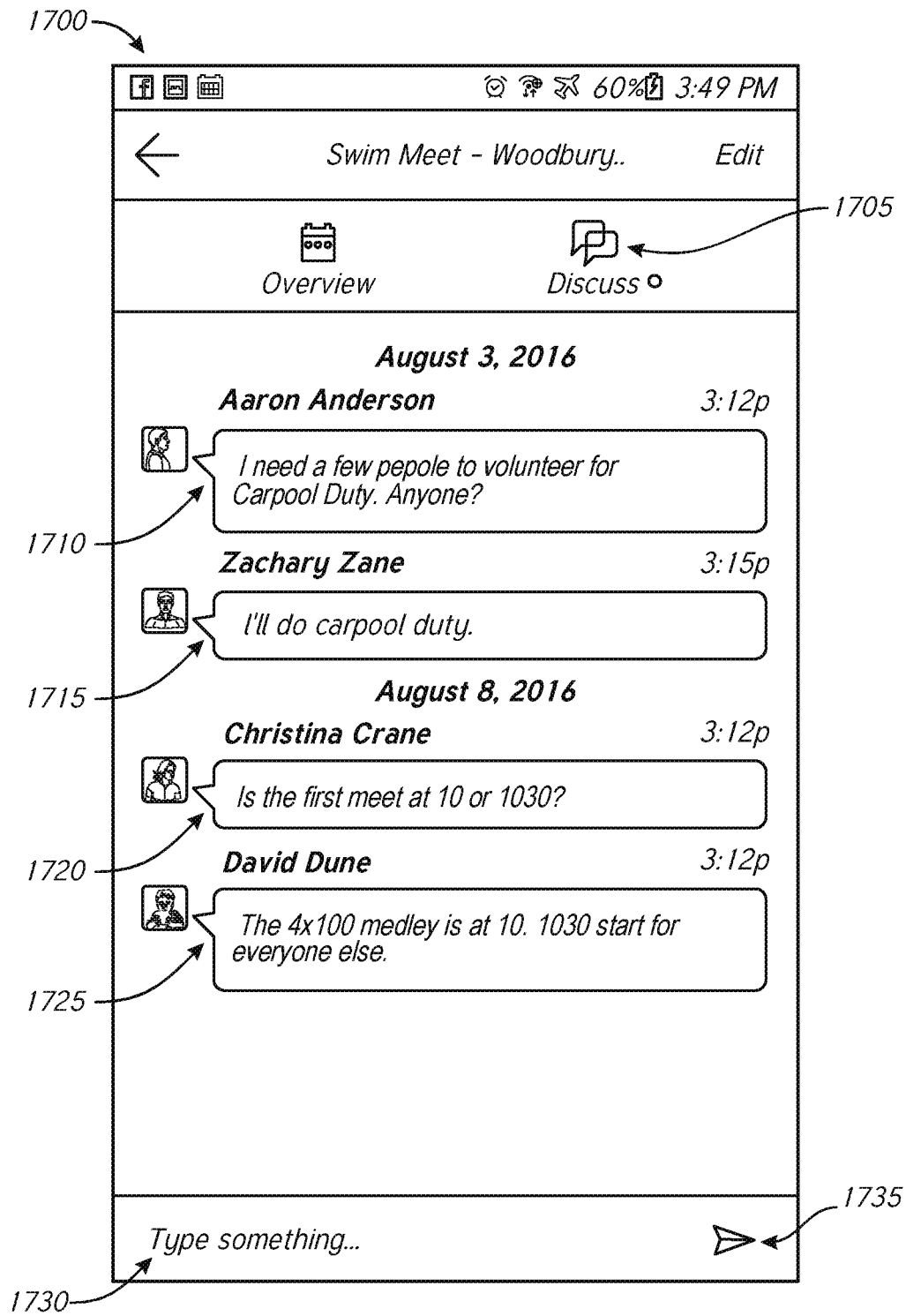
FIG. 17 is a diagram illustrating an example GUI according to one or more embodiments.

FIG. 17 is a diagram illustrating an example GUI 1700 according to one or more embodiments. In one embodiment, the GUI 1700 may be an interface viewing one or more messages associated with an event/meeting. The GUI 1700 may be presented by a calendar application (e.g., an app, an application, a program, a software module/component, etc.) that may allow a user to create/modify events/meetings and may be used to invite other users to the event/meeting. The calendar application (e.g., app) may be executed/operated on a computing device of a user (e.g., a smartphone, a tablet computer, etc.). In another embodiment, the GUI 1700 may be a webpage provided/presented by a calendar platform. For example, the GUI 1700 may be presented by and/or displayed within a web browser when the user accesses or logs into a calendar platform via the web browser. The GUI 1700 includes button 1705, text field 1730, button 1735, and messages 1710, 1715, 1520, and 1720. Although the GUI 1700 is illustrated using buttons, text fields, etc., one having ordinary skill in the art understands that other embodiments may use links and/or other graphical user interface controls or elements in place of one or more of the buttons, text fields, etc.

As illustrated in FIG. 17, a user may activate (e.g., click, select, tap, etc.) button 1705. When button 1705 is activated, the GUI 1700 may present one or messages (e.g., messages 1710-1725) related to or associated with an event/meeting. The messages 1710-1725 may be associated with the event/meeting illustrated in FIG. 16 (e.g., the "Swim Meet" event/meeting). The messages 1710-1729 may be part of a discussion related to or associated with the event/meeting. In one embodiment, the messages 1710-1725 may be from users who are authorized to access/view the event/meeting. In another embodiment, the messages 1710-1725 may be from users who have indicated that they will attend the event/meeting. The messages 1710-1725 may allow the users to communicate additional information related to the event/meeting. For example, the messages 1710-1725 may allow users to coordinate when activities in the event/meeting will occur, to coordinate transportation to the event/meeting etc. The messages 1710-1725 may also be referred to as chat messages, chats, text messages, text, multimedia messages, etc.

In one embodiment, the GUI 1700 may present one or more additional buttons or other user interface elements (not illustrated in FIG. 17) to allow the user to add media items to a discussion (e.g., to write a message that includes a media item). For example, the GUI 1700 may present one or more buttons similar to button 1105, 1110, and 1115 illustrated in FIG. 11. Activating these buttons may cause the GUI 1700 to present user interfaces similar to those illustrated in FIGS. 12-15 (e.g., GUI 1200, GUI 1300, GUI 1400, GUI 1500, etc.) to allow the user to select a media item (from a computing device of the user) to be added to a message. This may allow users to exchange messages (e.g., chat messages) to discuss various aspects and/or information for an event/meeting.

In one embodiment, the storage server may be separate from the calendar platform. For example, the storage server may be part of a cloud storage platform. In another embodiment, the storage server may be part of the cloud storage platform, as discussed above.

Additional Embodiments

In accordance with and/or in addition to the various embodiments and features disclosed above, certain additional embodiments and features fall within the scope of the present disclosure. For example, in certain embodiments, no traditional email communications are required for certain calendar notifications.

Calendar synchronization in accordance with embodiments disclosed herein may be implemented in various novel ways. For example, in certain embodiments, a single notification may be used for multi-calendar/multi-event updates; multiple calendar events may push to individual users by single notification. Certain embodiments provide for indirect public calendar sharing. For example, a shared calendar may be made available for anyone to access without direct invitation by the calendar owner/manager through sharing of link or calendar ID.

Systems, devices and methods disclosed herein may be used in any practical or desirable application or use case. As an example implementation, when a calendar update is published, multiple process steps and/or entities may be involved, such as the following possible entities/steps: a publish calendar message object may be sent from user device to user calendar manager on server; on the server, a listening service may trigger a calendar synchronization event; an event trigger object may be sent a synchronization manager service; a synchronization service module/device may push calendar update data object to other client devices; client devices may apply calendar update data object and return acknowledgement response; and/or other entities/steps.

In certain embodiments, new user setup and/or identification may be implemented at least in part by the following steps: a new user downloads an application to a device; a new user setup of and account without email communication may be implemented. Furthermore, calendar creation and/or updates may be implemented at least in part using one or more of the following steps: a user creates a private calendar; the user creates an event within the private calendar providing for calendar synchronization; the user may download an application on another device and set up the same account on a second device; the user may update events within a private calendar on the first device and view updates on the second device.

In certain embodiments, multi-event/multi-user calendar publication may be implemented using one or more of the following steps: a calendar owner may create a shared calendar; the calendar owner may create multiple events and may assign individual users to events; the calendar owner may publish the calendar; individual users may receive single calendar notification push to devices; the calendar owner may update several events within the calendar and republish the entire calendar.

In certain embodiments public sharing of a shared calendar may be implemented using one or more of the following steps: a calendar owner may make a shared calendar link/identifier available to the public (e.g., via web/voice), or a subsection thereof; a non-calendar user may obtain the calendar link/identifier and wish to join the calendar; the user may submit the share identifier to a calendar management server, and thereby be granted access to the calendar by the calendar management server.

Those skilled in the art will appreciate that in some embodiments, other types of calendar management systems can be implemented while remaining within the scope of the present disclosure. In addition, the actual steps taken in the processes discussed herein may differ from those described or shown in the figures. Depending on the embodiment, certain of the steps described above may be removed, and/or others may be added.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, application-specific integrated circuit (ASIC), field-programmable gate array (FPGA), or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

All of the processes described above may be embodied in, and fully automated via, software code modules executed by one or more general purpose or special purpose computers or processors. The code modules may be stored on any type of computer-readable medium or other computer storage device or collection of storage devices. Some or all of the methods may alternatively be embodied in specialized computer hardware.

The various illustrative logical blocks, modules, data structures, and processes described herein may be implemented as electronic hardware, computer software, or combinations of both. To clearly illustrate this interchangeability of hardware and software, various illustrative components, blocks, modules, and states have been described above generally in terms of their functionality. However, while the various modules are illustrated separately, they may share some or all of the same underlying logic or code. Certain of the logical blocks, modules, and processes described herein may instead be implemented monolithically.

The various illustrative logical blocks, modules, data structures, and processes described herein may be implemented or performed by a machine, such as a computer, a processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor may be a microprocessor, a controller, a microcontroller, a state machine, combinations of the same, or the like. A processor may also be implemented as a combination of computing devices—for example, a combination of a DSP and a microprocessor, a plurality of microprocessors or processor cores, one or more graphics or stream processors, one or more microprocessors in conjunction with a DSP, or any other such configuration.

The blocks or states of the processes described herein may be embodied directly in hardware, in a software module executed by a processor, or in a combination of the two. For example, each of the processes described above may also be embodied in, and fully automated by, software modules executed by one or more machines such as computers or computer processors. A module may reside in a computer-readable storage medium such as RAM memory, flash memory, ROM memory, EPROM memory, EEPROM memory, registers, a hard disk, a removable disk, a CD-ROM, memory capable of storing firmware, or any other form of computer-readable storage medium. An exemplary computer-readable storage medium can be coupled to a processor such that the processor can read information from, and write information to, the computer readable storage medium. In the alternative, the computer-readable storage medium may be integral to the processor. The processor and the computer-readable storage medium may reside in an ASIC.

Depending on the embodiment, certain acts, events, or functions of any of the processes or algorithms described herein can be performed in a different sequence, may be added, merged, or left out altogether. Thus, in certain embodiments, not all described acts or events are necessary for the practice of the processes. Moreover, in certain embodiments, acts or events may be performed concurrently, e.g., through multi-threaded processing, interrupt processing, or via multiple processors or processor cores, rather than sequentially.

What is claimed is:

1. A calendar management device comprising:
a non-volatile data storage medium; and
a controller configured to:
generate a calendar object representing a calendar;
generate a calendar share identifier associated with the calendar object;
store the calendar object in the non-volatile data storage medium;
associate the calendar object with user identifiers identifying a plurality of calendar users associated with a social media platform;
cause the calendar share identifier to be provided to each of the plurality of calendar users;

receive user input data indicating a streaming event to associate with the calendar object;
determine an authorization level of the event based at least in part on the user input data;
based at least in part on the authorization level, generate a calendar event object indicative of the streaming event;
associate the calendar event object with the calendar object;
cause update data to be sent to one or more devices associated with one or more of the plurality of calendar users without sending an email notification to the one or more of the plurality of calendar users, the update data indicating the streaming event;
provide a first graphical user interface to a first user, the first graphical user interface including one or more first graphical interface elements to receive media data to associate with the streaming event;
receive video data of the first user to associate with the streaming event;
embed the video data within the calendar event object;
provide a second graphical user interface that includes information about the streaming event, discussion data including one or more messages about the streaming event from one or more additional users, and one or more second graphical interface elements to access to the video data;
receive a request for a second user to access the streaming event;
facilitate payment processing for the second user to access the streaming event;
authorize the second user to access the streaming event based at least in part on social media account information associated with the second user; and
provide access to the video data based at least in part on the authorizing the second user.

2. The calendar management device of claim 1, wherein the controller is further configured to:
store the video media data on a storage server.

3. The calendar management device of claim 1, wherein the controller is further configured to:
receive the discussion data; and
associate the discussion data with the calendar event object.

4. The calendar management device of claim 3, wherein the one or more messages in the discussion data are from one or more users authorized to access the streaming event.

5. The calendar management device of claim 1, wherein the controller is further configured to:
determine a subset of the plurality of calendar users based at least in part on the authorization level;
wherein the update data is sent to a respective device of each of the subset of the plurality of calendar users.

6. The calendar management device of claim 1, wherein the controller is further configured to receive an acknowledgement response from each of the plurality of calendar users in response to said causing the calendar share identifier to be provided to each of the plurality of calendar users.

7. The calendar management device of claim 6, wherein the controller is further configured to, in response to receiving the acknowledgment responses, store the user identifiers associated with the plurality of calendar users in the non-volatile data storage media as part of the calendar object.

8. The calendar management device of claim 1, wherein the controller is configured to cause the calendar share identifier to be provided to each of the plurality of calendar users by transmitting the calendar share identifier to a respective device of the plurality of calendar users over a network using a wireless transmitter.

9. The calendar management device of claim 1, wherein the controller is further configured to:
determine that individual ones of the plurality of calendar users are associated with a user contacts list;
wherein the calendar share identifier is provided to each of the plurality of calendar users based at least in part on determining that individual ones of the plurality of calendar users are associated with the user contacts list.

10. A method for managing calendar data using a calendar management device, the method comprising:
generating, by a controller of a calendar management device, a calendar object representing a calendar;
generating, by the controller, a calendar share identifier associated with the calendar object;
storing, by the controller, the calendar object in a data storage medium;
identifying, by the controller, a plurality of calendar users associated with a social media platform;
causing, by the controller, the calendar share identifier to be provided to each of the plurality of calendar users;
receiving, by the controller, user input data indicating a streaming event to associate with the calendar object;
generating, by the controller, a calendar event object indicative of the streaming event;
associating, by the controller, the calendar event object with the calendar object;
causing, by the controller, update data to be sent to one or more devices associated with one or more of the plurality of calendar users without sending an email notification to the one or more of the plurality of calendar users, the update data indicating the streaming event;
providing, by the controller, a first graphical user interface to a first user, the first graphical user interface including one or more first graphical interface elements to receive media data to associate with the streaming event;
receiving, by the controller, video data to associate with the streaming event;
embedding, by the controller, the video data within the calendar event object;
providing, by the controller, a second graphical user interface that includes information about the streaming event, discussion data including one or more messages about the streaming event from one or more additional users, and one or more second graphical interface elements to access to the video data;
receiving, via the second graphical user interface, a request for a second user to access to the calendar event object;
facilitating, by the controller, payment processing for the second user to access the streaming event;
authorizing the second user to access the streaming event based at least in part on social media account information associated with the second user; and
providing access to the video data based at least in part on the authorizing the second user.

11. The method of claim 10, further comprising:
storing the video data on a storage server.

12. The method of claim 10, further comprising:
receiving the discussion data; and
associating the discussion data with the calendar event object.

13. The method of claim 10, further comprising:
determining a subset of the plurality of calendar users based at least in part on the authorization level;

wherein the update data is sent to each of the subset of the plurality of calendar users.

14. The method of claim 10, further comprising:
determining that individual ones of the plurality of calendar users are associated with a user contacts list;
wherein the calendar share identifier is provided to each of the plurality of calendar users based at least in part on determining that individual ones of the plurality of calendar users are associated with the user contacts list.

15. A calendar management system comprising:
one or more non-transitory computer-readable media; and
a controller communicatively coupled to the one or more non-transitory computer-readable media and configured to:
generate a calendar object representing a calendar;
generate a calendar share identifier associated with the calendar object;
store the calendar object;
identify a plurality of calendar users associated with a social media platform;
sending the calendar share identifier to a plurality of calendar user devices associated with the plurality of calendar users, respectively;
receive user input data indicating a streaming event to associate with the calendar object;
generate a calendar event object indicative of the streaming event;
associate the calendar event object with the calendar object;
cause update data to be sent to one or more of the plurality of calendar user devices without sending an email notification to the one or more of the plurality of calendar user devices, the update data indicating the streaming event;
provide a first graphical user interface to a first user, the first graphical user interface including one or more first graphical interface elements to receive media data to associate with the streaming event;
receive video data to associate with the streaming event;
embed the video data within the calendar event object;
provide a second graphical user interface that includes information about the streaming event, discussion data including one or more messages about the streaming event from one or more additional users, and one or more second graphical interface elements to access to the video data;
receive, via the second graphical user interface, a request for a second user to access the calendar event object;
facilitate payment processing for the second user to access the streaming event;
authorize the second user to access the streaming event based at least in part on social media account information associated with the second user; and
based at least in part on authorizing the second user, provide the video data to the second user in real-time as the video data is received.

16. The calendar management system of claim 15, wherein the controller is further configured to:
store the video data on a storage server.

17. The calendar management system of claim 15, wherein the controller is further configured to:
receive the discussion data; and
associate the discussion data with the calendar event object.

18. The calendar management system of claim 15, wherein the controller is further configured to
determine a subset of the plurality of calendar user devices based at least in part on an authorization level;
wherein the calendar event object is sent to each of the subset of the plurality of calendar user devices.

19. The calendar management system of claim 15, wherein the sending the calendar share identifier to the plurality of calendar user devices comprises sending the share identifier to the plurality of calendar user devices without sending another email notification to the plurality of calendar users.

20. The calendar management system of claim 15, wherein the controller is further configured to:
determine that individual ones of the plurality of calendar users are associated with a user contacts list;
wherein the calendar share identifier is sent to the plurality of calendar user devices based at least in part on determining that individual ones of the plurality of calendar users are associated with the user contacts list.

* * * * *